(12) United States Patent
Chang et al.

(10) Patent No.: US 12,470,971 B2
(45) Date of Patent: Nov. 11, 2025

(54) COMMUNICATION METHOD AND APPARATUS

(71) Applicant: HUAWEI TECHNOLOGIES CO., LTD., Guangdong (CN)

(72) Inventors: Junren Chang, Beijing (CN); Lei Han, Beijing (CN); Lingping Wang, Shanghai (CN); Shulan Feng, Beijing (CN); Jianghua Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 429 days.

(21) Appl. No.: 18/148,509

(22) Filed: Dec. 30, 2022

(65) Prior Publication Data

US 2023/0139024 A1 May 4, 2023

Related U.S. Application Data

(63) Continuation of application No. PCT/CN2020/100241, filed on Jul. 3, 2020.

(51) Int. Cl.
*H04W 28/02* (2009.01)
*H04W 48/16* (2009.01)

(52) U.S. Cl.
CPC ....... *H04W 28/0215* (2013.01); *H04W 48/16* (2013.01)

(58) Field of Classification Search
None
See application file for complete search history.

(56) References Cited

U.S. PATENT DOCUMENTS

| | | |
|---|---|---|
| 2012/0076076 A1 | 3/2012 | Kim et al. |
| 2014/0187224 A1 | 7/2014 | Liu et al. |
| 2015/0103748 A1 | 4/2015 | Song et al. |

(Continued)

FOREIGN PATENT DOCUMENTS

| | | |
|---|---|---|
| CN | 103068070 A | 4/2013 |
| CN | 109548172 A | 3/2019 |

(Continued)

OTHER PUBLICATIONS

International Search Report and Written Opinion issued in PCT/CN2020/100241, dated Mar. 19, 2021, 9 pages.

(Continued)

*Primary Examiner* — Walter J Divito

(57) ABSTRACT

The present disclosure relates to the field of communication technologies, and discloses a communication method and apparatus. The method includes: A terminal device receives an identifier of a filtering protocol version from an access network device, and then sends first capability information of the terminal device to the access network device based on the filtering protocol version. In this method, the terminal device may report capability information based on the filtering protocol version sent by the access network device. Compared with a manner in which the terminal device directly reports the capability information, this method can effectively reduce a communication problem caused by mismatch between a protocol version supported by the terminal device and a protocol version supported by the access network device and/or a protocol version supported by a core network device.

19 Claims, 13 Drawing Sheets

(56) References Cited

U.S. PATENT DOCUMENTS

| | | |
|---|---|---|
| 2015/0264637 A1 | 9/2015 | Zaus et al. |
| 2020/0092879 A1 | 3/2020 | Wu |
| 2022/0109746 A1* | 4/2022 | Lindheimer ............ H04L 69/24 |
| 2022/0312277 A1* | 9/2022 | Akdeniz ............. H04W 72/569 |
| 2022/0393839 A1* | 12/2022 | Jung .................... H04W 76/10 |

FOREIGN PATENT DOCUMENTS

| | | |
|---|---|---|
| CN | 109982313 A | 7/2019 |
| WO | 2017088498 A1 | 6/2017 |

OTHER PUBLICATIONS

Extended European Search Report issued in EP20943580.9, dated Jun. 29, 2023, 13 pages.

Office Action issued in CN2020800072677, dated Jan. 13, 2023, 8 pages.

Office Action issued in CN2020800072677, dated Apr. 22, 2023, pages.

\* cited by examiner

COMMUNICATION METHOD AND APPARATUS

CROSS-REFERENCE TO RELATED APPLICATIONS

This application is a continuation of International Application No. PCT/CN2020/100241, filed on Jul. 3, 2020, the disclosure of which is hereby incorporated by reference in its entirety.

TECHNICAL FIELD

The present disclosure relates to the field of wireless communication technologies, and in particular, to a communication method and apparatus.

BACKGROUND

Because wireless communication technologies continuously evolve, more new features are added, and vulnerabilities are fixed, versions of wireless communication technology protocols are gradually upgraded and improved, for example, from initially released commercial protocol versions (release 8, R8) and R9 to related protocol versions R10, R11, and R12 of advanced long term evolution (LTE-A) communication technologies, and then to related protocol versions R15, R16, R17, and the like of the fifth generation (5G) communication technologies.

Due to diversity of the protocol versions, for an actually deployed base station and core network device, base stations supporting different protocol versions may coexist, for example, an actually deployed base station 1 and base station 2 may support different protocol versions. Alternatively, core network devices supporting different protocol versions may exist, for example, an actually deployed core network device 1 and core network device 2 may support different protocol versions. In this case, a problem may occur in communication between a terminal device and a network device (for example, the base station or the core network device) because the terminal device is incompatible with the network device.

SUMMARY

The present disclosure provides a communication method and apparatus, to reduce a communication problem caused by incompatibility between a terminal device and a network device.

According to a first aspect, an embodiment of the present disclosure provides a communication method. The method may be applied to a terminal device or a chip in the terminal device. For example, the method is applicable to the terminal device. In the method, the terminal device receives an identifier of a filtering protocol version from a first access network device, and sends first capability information of the terminal device to the first access network device based on the filtering protocol version.

In this method, the terminal device may report capability information based on the filtering protocol version sent by the access network device. Compared with a manner in which the terminal device directly reports the capability information, this method can effectively reduce a communication problem caused by mismatch between a protocol version supported by the terminal device and a protocol version supported by the access network device and/or a protocol version supported by a core network device.

In a possible design, a protocol version corresponding to the first capability information is earlier than or equal to the filtering protocol version.

In a possible design, the sending first capability information of the terminal device to the first access network device based on the filtering protocol version includes: after determining, based on the filtering protocol version, that the filtering protocol version is different from a historical filtering protocol version, sending the first capability information of the terminal device to the first access network device.

In this method, after determining that the filtering protocol version is different from the historical filtering protocol version, the terminal device may actively send the first capability information of the terminal device to the first access network device.

In a possible design, the filtering protocol version is later than the historical filtering protocol version; and the first capability information includes incremental information relative to historical capability information reported by the terminal device based on the historical filtering protocol version.

In this method, the terminal device may report the incremental information, so that an amount of transmitted information is small, thereby effectively reducing transmission resources.

In a possible design, the method further includes: receiving indication information from the first access network device, where the indication information indicates to report capability information in an incremental manner.

In this method, the first access network device may indicate, to the terminal device, a manner of reporting the capability information, thereby improving control flexibility of the first access network device.

In a possible design, the indication information includes an identifier of the historical filtering protocol version.

In a possible design, the method further includes: sending at least one of the following to the first access network device: an identifier of a protocol version corresponding to the first capability information: an identifier of a protocol version supported by the terminal device; and indication information, where the indication information indicates that the protocol version supported by the terminal device is later than or earlier than or equal to the filtering protocol version.

In a possible design, the filtering protocol version includes a protocol version supported by the first access network device and/or a protocol version supported by a core network device; or the filtering protocol version is earlier than a protocol version supported by the first access network device and/or a protocol version supported by a core network device.

In a possible design, the protocol version is considered supported by the first access network device when it satisfies either of the following conditions: the first access network device supports a feature of the protocol version, or the first access network device supports parsing of protocol signaling corresponding to the protocol version. That the protocol version is considered supported by the core network device when it satisfies either of the following conditions: the core network device supports a feature of the protocol version, or the core network device supports parsing of protocol signaling corresponding to the protocol version.

In a possible design, the method further includes: receiving, from the first access network device, one or more identifiers of one or more protocol versions supported by at least one neighboring access network device of the first access network device.

In a possible design, the method further includes: measuring a frequency of a second access network device in the at least one neighboring access network device or reselecting the second access network device based on the one or more identifiers of the one or more protocol versions supported by the at least one neighboring access network device, where a protocol version supported by the second access network device is later than or equal to the protocol version supported by the terminal device.

In this method, the first access network device sends the one or more identifiers of the one or more protocol versions supported by the at least one neighboring access network device to the terminal device, so that the terminal device can preferably reselect the second access network device or preferably measure the second access network device, to avoid a subsequent incompatibility problem, or avoid capability fallback of the terminal device, to ensure service performance of the terminal device.

In a possible design, the one or more identifiers of the one or more protocol versions supported by the at least one neighboring access network device is/are carried in an RRC connection release message or a system message.

In a possible design, the one or more identifiers of the one or more filtering protocol versions is/are carried in a capability query message, an RRC connection setup message, an RRC connection resume message, an RRC connection reestablishment message, a handover command message, or a system message.

According to a second aspect, an embodiment of the present disclosure provides a communication method. The method may be applied to a first access network device or a chip in the first access network device. For example, the method is applicable to the first access network device. In the method, the first access network device sends an identifier of a filtering protocol version to a terminal device, and receives first capability information from the terminal device. A protocol version corresponding to the first capability information is earlier than or equal to the filtering protocol version.

In a possible design, the method further includes: sending the first capability information and the identifier of the filtering protocol version to a core network device.

In a possible design, the method further includes: receiving first information from the terminal device, and sending the first information to the core network device, where the first information includes at least one of the following: an identifier of the protocol version corresponding to the first capability information: an identifier of a protocol version supported by the terminal device; and indication information, where the indication information indicates that the protocol version supported by the terminal device is later than or earlier than or equal to the filtering protocol version.

In a possible design, the sending an identifier of a filtering protocol version to a terminal device includes: receiving historical capability information of the terminal device and an identifier of a historical filtering protocol version from the core network device; and after determining that the filtering protocol version is different from the historical filtering protocol version, sending the identifier of the filtering protocol version to the terminal device.

In a possible design, the filtering protocol version is later than the historical filtering protocol version; and the first capability information includes incremental information relative to historical capability information reported by the terminal device based on the historical filtering protocol version.

In a possible design, the method further includes: sending indication information to the terminal device, where the indication information indicates to report capability information in an incremental manner.

In a possible design, the indication information includes the identifier of the historical filtering protocol version.

In a possible design, the filtering protocol version includes a protocol version supported by the first access network device and/or a protocol version supported by the core network device; or the filtering protocol version is earlier than a protocol version supported by the first access network device and/or a protocol version supported by the core network device.

In a possible design, the method further includes: obtaining capability information of at least one neighboring access network device of the first access network device; and sending, to the terminal device, one or more identifiers of one or more protocol versions supported by the at least one neighboring access network device.

In a possible design, the method further includes: sending the identifier of the filtering protocol version to a second access network device, where the first access network device is a source access network device of the terminal device, and the second access network device is a target access network device of the terminal device.

In a possible design, the one or more identifiers of the one or more filtering protocol versions is/are carried in a capability query message, an RRC connection setup message, an RRC connection resume message, an RRC connection reestablishment message, or a system message.

In a possible design, the method further includes: receiving a handover request acknowledgment message from a second access network device, where the handover request acknowledgment message includes the identifier of the filtering protocol version, and the identifier of the filtering protocol version is an identifier of a filtering protocol version corresponding to the second access network device, where the first access network device is a source access network device of the terminal device, and the second access network device is a target access network device of the terminal device.

In a possible design, an identifier of a filtering protocol version corresponding to the first access network device is different from the identifier of the filtering protocol version corresponding to the second access network device.

In a possible design, the method further includes: sending the identifier of the filtering protocol version corresponding to the first access network device to the second access network device.

In a possible design, the sending an identifier of a filtering protocol version to a terminal device includes: sending a handover command message to the terminal device, where the handover command message includes the identifier of the filtering protocol version.

According to a third aspect, an embodiment of the present disclosure provides a communication method. The method may be applied to a core network device or a chip in the core network device. For example, the method is applicable to the core network device. In the method, the core network device receives a request message from an access network device, where the request message includes an identifier of a terminal device, and sends historical capability information of the terminal device and an identifier of a historical filtering protocol version to the access network device based on the identifier of the terminal device.

In a possible design, the method further includes: sending, to the access network device, an identifier of a protocol version supported by the terminal device.

According to a fourth aspect, an embodiment of the present disclosure provides a communication method. The method may be applied to a second access network device or a chip in the second access network device. For example, the method is applicable to the second access network device. In the method, the second access network device determines an identifier of a filtering protocol version corresponding to the second access network device, and sends, to a first access network device, the identifier of the filtering protocol version corresponding to the second access network device. The first access network device is a source access network device of a terminal device, and the second access network device is a target access network device of the terminal device.

In a possible design, the sending, to the first access network device, the identifier of the filtering protocol version corresponding to a second access network device includes: receiving, from the first access network device, an identifier of a filtering protocol version corresponding to the first access network device, and after determining that the identifier of the filtering protocol version corresponding to the second access network device is different from the identifier of the filtering protocol version corresponding to the first access network device, sending, to the first access network device, the identifier of the filtering protocol version corresponding to the second access network device.

It should be noted that the methods described in the second aspect, the third aspect, and the fourth aspect correspond to the method described in the first aspect. For beneficial effects of related technical features in the methods described in the second aspect, the third aspect, and the fourth aspect, refer to the descriptions of the first aspect. Details are not described again.

According to a fifth aspect, an embodiment of the present disclosure provides a communication method. The method may be applied to a terminal device or a chip in the terminal device. For example, the method is applicable to the terminal device. In the method, the terminal device receives first information from a first access network device, where the first information includes product version information of the first access network device and/or product version information of a first core network device, and sends first capability information of the terminal device to the first access network device based on the first information.

In this method, the terminal device may report capability information based on the product version information sent by the access network device. Compared with a manner in which the terminal device directly reports the capability information, this method can effectively reduce a communication problem caused by incompatibility between the terminal device and the access network device and/or the core network device.

In a possible design, the first information includes the product version information of the first access network device, the first capability information is determined based on historical communication information between the terminal device and a second access network device, and product version information of the second access network device is the same as the product version information of the first access network device.

In a possible design, the historical communication information between the terminal device and the second access network device includes at least one of the following: connection setup failure information, handover failure information, dual connectivity setup failure information, RRC connection reestablishment failure information, RRC connection resume failure information, SCG addition failure information, SCG change failure information, reconfiguration compatibility detection failure information, and reconfiguration failure information.

In a possible design, the product version information of the first access network device includes at least one of the following: manufacturer information of the first access network device, information about a network to which the first access network device belongs, information about an area to which the first access network device belongs, and software version information of the first access network device.

In a possible design, the first information includes the product version information of the first core network device, the first capability information is determined based on historical communication information between the terminal device and a second core network device, and a product version of the second core network device is the same as a product version of the first core network device.

In a possible design, the historical communication information between the terminal device and the second core network device includes registration failure information.

In a possible design, the product version information of the core network device includes at least one of the following: manufacturer information of the core network device, information about a network to which the core network device belongs, information about an area to which the core network device belongs, and software version information of the core network device.

According to a sixth aspect, an embodiment of the present disclosure provides a communication method. The method may be applied to a first access network device or a chip in the first access network device. For example, the method is applicable to the first access network device. In the method, the first access network device sends an identifier of a product version of the first access network device to a terminal device, and receives first capability information from the terminal device, where the first capability information is determined based on historical communication information between the terminal device and a second access network device, and product version information of the second access network device is the same as product version information of the first access network device.

In the foregoing method, when the product version information of the first access network device is the same as the product version information of the second access network device, the terminal device may determine the first capability information based on the historical communication information between the terminal device and the second access network device, and report the first capability information to the first access network device, so that a problem of incompatibility between the terminal device and the first access network device can be effectively avoided by using the historical communication information. In addition, compared with a case in which the terminal device needs to make many capability reduction attempts to ensure normal access or registration because the terminal device does not know the product version information, the method can effectively improve access or registration efficiency of the terminal device.

In a possible design, the method further includes: sending product version information of a first core network device to the terminal device; and receiving second capability information from the terminal device, where the second capability information is determined based on historical communication information between the terminal device and a second core network device, and product version information of the second core network device is the same as the product version information of the first core network device.

According to a seventh aspect, an embodiment of the present disclosure provides a communication method. The method may be applied to a terminal device or a chip in the terminal device. For example, the method is applicable to the terminal device. In the method, the terminal device receives cached capability information from an access network device, and sends first capability information to the access network device based on the cached capability information.

In this method, the terminal device may report capability information based on the cached capability information sent by the access network device. Compared with a manner in which the terminal device directly reports the capability information, this method can effectively reduce a communication problem caused by mismatch between the capability information reported by the terminal device and the cached capability information of the access network device and/or cached capability information of a core network device.

In a possible design, the cached capability information is carried in a capability query message, an RRC connection setup message, an RRC connection resume message, an RRC connection reestablishment message, a handover command message, or a system message.

In a possible design, the cached capability information indicates a size of cache space for storing the capability information of the terminal device by the access network device, the first capability information includes access stratum capability information, and an amount of data included in the access stratum capability information is less than or equal to the size of the cache space.

In a possible design, the cached capability information indicates a size of cache space for storing the capability information of the terminal device by the core network device, the first capability information includes access stratum capability information and network layer capability information, and an amount of data included in the first capability information is less than or equal to the size of the cache space.

According to an eighth aspect, an embodiment of the present disclosure provides a communication method. The method may be applied to an access network device or a chip in the access network device. For example, the method is applicable to the access network device. In the method, the access network device sends cached capability information to a terminal device, and receives first capability information from the terminal device, where the first capability information is determined based on the cached capability information.

In a possible design, the cached capability information is carried in a capability query message, an RRC connection setup message, an RRC connection resume message, an RRC connection reestablishment message, a handover command message, or a system message.

In a possible design, the cached capability information indicates a size of cache space for storing the capability information of the terminal device by the access network device, the first capability information includes access stratum capability information, and an amount of data included in the access stratum capability information is less than or equal to the size of the cache space.

In a possible design, the cached capability information indicates a size of cache space for storing the capability information of the terminal device by the core network device, the first capability information includes access stratum capability information and network layer capability information, and an amount of data included in the first capability information is less than or equal to the size of the cache space.

According to a ninth aspect, an embodiment of the present disclosure provides a communication apparatus. The communication apparatus may be a terminal device or a chip disposed inside the terminal device. The communication apparatus has a function of implementing the first aspect, the fifth aspect, or the seventh aspect. For example, the communication apparatus includes a corresponding module, unit, or means for performing steps in the first aspect, the fifth aspect, or the seventh aspect. The function, unit, or means may be implemented by software, may be implemented by hardware, or may be implemented by hardware executing corresponding software.

In a possible design, the communication apparatus includes a processing unit and a communication unit. The communication unit may be configured to send and receive a signal, to implement communication between the communication apparatus and another apparatus. For example, the communication unit is configured to receive configuration information from the terminal device. The processing unit may be configured to perform some internal operations of the communication apparatus. Functions performed by the processing unit and the communication unit may correspond to the operations in the first aspect.

In a possible design, the communication apparatus includes a processor, and may further include a transceiver. The transceiver is configured to send and receive a signal, and the processor executes program instructions to complete the method in any one of the possible designs or implementations of the first aspect, the fifth aspect, or the seventh aspect. The communication apparatus may further include one or more memories. The memory is configured to be coupled to the processor. The memory may store a computer program or instructions necessary for implementing the function in the first aspect, the fifth aspect, or the seventh aspect. The processor may execute the computer program or instructions stored in the memory. When the computer program or the instructions is/are executed, the communication apparatus is enabled to implement the method in any one of the possible designs or implementations of the first aspect, the fifth aspect, or the seventh aspect.

In a possible design, the communication apparatus includes a processor, and the processor may be configured to be coupled to a memory. The memory may store a computer program or instructions necessary for implementing the function in the first aspect, the fifth aspect, or the seventh aspect. The processor may execute the computer program or instructions stored in the memory. When the computer program or the instructions is/are executed, the communication apparatus is enabled to implement the method in any one of the possible designs or implementations of the first aspect, the fifth aspect, or the seventh aspect.

In a possible design, the communication apparatus includes a processor and a memory. The memory may store a computer program or instructions necessary for implementing the function in the first aspect. The processor may execute the computer program or instructions stored in the memory. When the computer program or the instructions is/are executed, the communication apparatus is enabled to implement the method in any one of the possible designs or implementations of the first aspect, the fifth aspect, or the seventh aspect.

In a possible design, the communication apparatus includes a processor and an interface circuit. The processor is configured to communicate with another apparatus through the interface circuit, and perform the method in any one of the possible designs or implementations of the first aspect, the fifth aspect, or the seventh aspect.

According to a tenth aspect, the present disclosure provides a communication apparatus. The communication apparatus may be an access network device (for example, a first access network device or a second access network device) or a chip disposed inside the access network device. The communication apparatus has a function of implementing the second aspect, the fourth aspect, the sixth aspect, or the eighth aspect. For example, the communication apparatus includes a corresponding module, unit, or means for performing operations in the second aspect, the fourth aspect, the sixth aspect, or the eighth aspect. The function, unit, or means may be implemented by software, may be implemented by hardware, or may be implemented by hardware executing corresponding software.

In a possible design, the communication apparatus includes a processing unit and a communication unit. The communication unit may be configured to send and receive a signal, to implement communication between the communication apparatus and another apparatus. For example, the communication unit is configured to receive configuration information from a terminal device. The processing unit may be configured to perform some internal operations of the communication apparatus. Functions performed by the processing unit and the communication unit may correspond to the operations in the second aspect, the fourth aspect, the sixth aspect, or the eighth aspect.

In a possible design, the communication apparatus includes a processor, and the processor may be configured to be coupled to a memory. The memory may store a computer program or instructions necessary for implementing the function in the second aspect, the fourth aspect, the sixth aspect, or the eighth aspect. The processor may execute the computer program or instructions stored in the memory. When the computer program or the instructions is/are executed, the communication apparatus is enabled to implement the method in any one of the possible designs or implementations of the second aspect, the fourth aspect, the sixth aspect, or the eighth aspect.

In a possible design, the communication apparatus includes a processor and a memory. The memory may store a computer program or instructions necessary for implementing the function in the second aspect, the fourth aspect, the sixth aspect, or the eighth aspect. The processor may execute the computer program or instructions stored in the memory. When the computer program or the instructions is/are executed, the communication apparatus is enabled to implement the method in any one of the possible designs or implementations of the second aspect, the fourth aspect, the sixth aspect, or the eighth aspect.

In a possible design, the communication apparatus includes a processor and an interface circuit. The processor is configured to communicate with another apparatus through the interface circuit, and perform the method in any one of the possible designs or implementations of the second aspect, the fourth aspect, the sixth aspect, or the eighth aspect.

According to an eleventh aspect, the present disclosure provides a communication apparatus. The communication apparatus may be a core network device or a chip disposed in the core network device. The communication apparatus has a function of implementing the third aspect. For example, the communication apparatus includes a corresponding module, unit, or means for performing operations in the third aspect. The function, unit, or means may be implemented by software, may be implemented by hardware, or may be implemented by hardware executing corresponding software.

In a possible design, the communication apparatus includes a processing unit and a communication unit. The communication unit may be configured to send and receive a signal, to implement communication between the communication apparatus and another apparatus. For example, the communication unit is configured to send system information to a terminal device. The processing unit may be configured to perform some internal operations of the communication apparatus. Functions performed by the processing unit and the communication unit may correspond to the operations in the third aspect.

In a possible design, the communication apparatus includes a processor, and the processor may be configured to be coupled to a memory. The memory may store a computer program or instructions necessary for implementing the function in the third aspect. The processor may execute the computer program or instructions stored in the memory. When the computer program or the instructions is/are executed, the communication apparatus is enabled to implement the method in any one of the possible designs or implementations of the third aspect.

In a possible design, the communication apparatus includes a processor and a memory. The memory may store a computer program or instructions necessary for implementing the function in the third aspect. The processor may execute the computer program or instructions stored in the memory. When the computer program or the instructions is/are executed, the communication apparatus is enabled to implement the method in any one of the possible designs or implementations of the third aspect.

In a possible design, the communication apparatus includes a processor and an interface circuit. The processor is configured to communicate with another apparatus through the interface circuit, and perform the method in any one of the possible designs or implementations of the third aspect.

It may be understood that in the ninth aspect, the tenth aspect, or the eleventh aspect, the processor may be implemented by hardware or software. When the processor is implemented by hardware, the processor may be a logic circuit, an integrated circuit, or the like. When the processor is implemented by software, the processor may be a general-purpose processor, and is implemented by reading software code stored in the memory. In addition, there may be one or more processors, and one or more memories. The memory may be integrated with the processor, or the memory and the processor are disposed separately. In a specific implementation process, the memory and the processor may be integrated into one chip, or may be disposed on different chips. A type of the memory and a manner in which the memory and the processor are disposed are not limited in embodiments of the present disclosure.

According to a twelfth aspect, an embodiment of the present disclosure provides a communication system. The communication system may include a terminal device and a first access network device. The terminal device may be configured to perform the method in any one of the possible designs or implementations of the first aspect, and the first access network device may be configured to perform the method in any one of the possible designs or implementations of the second aspect.

In a possible design, the communication system may further include a core network device, and the core network device may be configured to perform the method in any one of possible designs or implementations of the third aspect.

In a possible design, the communication system may further include a second access network device, and the second access network device may be configured to perform the method in any one of possible designs or implementations of the fourth aspect.

According to a thirteenth aspect, an embodiment of the present disclosure provides a communication system. The communication system may include a terminal device and a first access network device. The terminal device may be configured to perform the method in any one of the possible designs or implementations of the fifth aspect, and the first access network device may be configured to perform the method in any one of the possible designs or implementations of the sixth aspect.

According to a fourteenth aspect, an embodiment of the present disclosure provides a communication system. The communication system may include a terminal device and an access network device. The terminal device may be configured to perform the method in any one of possible designs or implementations of the seventh aspect, and the access network device may be configured to perform the method in any one of possible designs or implementations of the eighth aspect.

According to a fifteenth aspect, the present disclosure provides a computer-readable storage medium, and the computer-readable storage medium stores computer-readable instructions. When a computer reads and executes the computer-readable instructions, the computer is enabled to perform the method in any one of possible designs of the first aspect to the eighth aspect.

According to a sixteenth aspect, the present disclosure provides a computer program product. When a computer reads and executes the computer program product, the computer is enabled to perform the method in any one of possible designs of the first aspect to the eighth aspect.

According to a seventeenth aspect, the present disclosure provides a chip. The chip includes a processor, and the processor is coupled to a memory, and is configured to read and execute a software program stored in the memory, to implement the method in any one of the possible designs of the first aspect to the eighth aspect.

These aspects or other aspects in the present disclosure may be clearer and more intelligible in descriptions in the following embodiments.

BRIEF DESCRIPTION OF DRAWINGS

FIG. 8a-1 and FIG. 8a-2 are a schematic flowchart corresponding to a communication method according to Embodiment 6 of the present disclosure:

DESCRIPTION OF EMBODIMENTS

The following describes the technical solutions in embodiments of the present invention with reference to the accompanying drawings in embodiments of the present invention.

Figure 1:
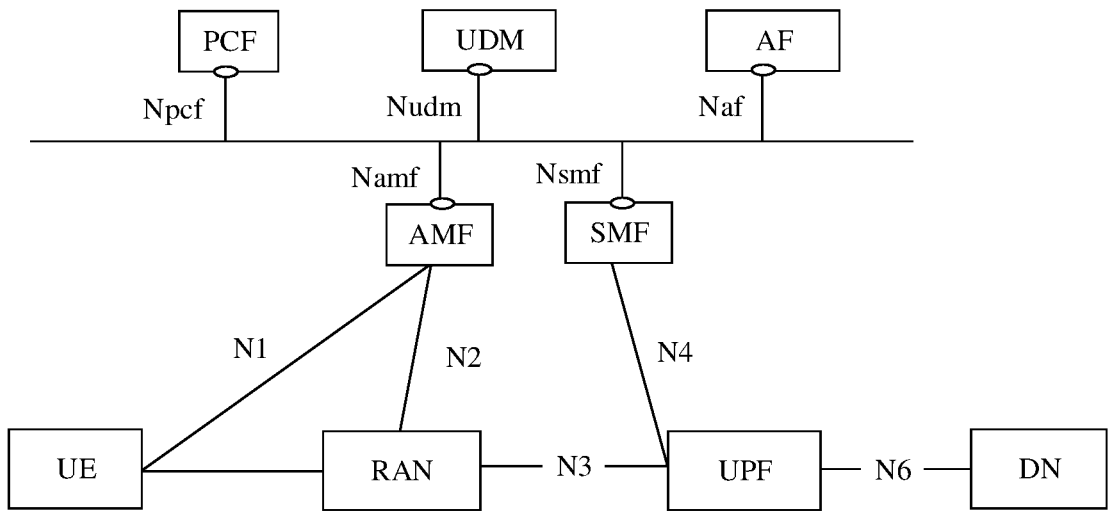
FIG. 1 is a schematic diagram of a network architecture to which an embodiment of the present disclosure is applicable.

FIG. 1 is a schematic diagram of a network architecture to which an embodiment of the present disclosure is applicable. As shown in FIG. 1, a terminal device may access a wireless network, to access services of external networks (for example, a data network (DN)) through the wireless network, or communicate with other devices through the wireless network, for example, communicate with another terminal device. The wireless network includes a radio access network (RAN) and a core network (CN). The RAN may also be referred to as an access network (AN), and is configured to connect the terminal device to the wireless network. The CN is configured to manage the terminal device and provide a gateway for communicating with the DN.

The following separately describes in detail the terminal device, the RAN, and the CN in FIG. 1.

1. Terminal Device

The terminal device, which may also be referred to as user equipment (UE), includes a device that provides voice and/or data connectivity to a user, for example, may be a handheld device having a wireless connection function, or a processing device connected to a wireless modem. The terminal device may communicate with a core network through a radio access network (RAN), and exchange a voice and/or data with the RAN. The terminal device may include a wireless terminal device, a mobile terminal device, a device-to-device (D2D) terminal device, a vehicle-toeverything (V2X) terminal device, a machine-to-machine/machine-type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user equipment, or the like. For example, the terminal device may include a mobile phone (which is also referred to as a "cellular" phone), a computer with a mobile terminal device, a portable, pocket-sized, handheld, or computer built-in mobile apparatus, or the like. For example, it may be a device such as a personal communication service (PCS) phone, a cordless telephone set, a session initiation protocol (SIP) phone, a wireless local loop (WLL) station, or a personal digital assistant (PDA). The terminal device may alternatively include a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

In embodiments of the present disclosure, an apparatus configured to implement a function of the terminal device may be the terminal device, or may be an apparatus that can support the terminal device in implementing the function, for example, a chip system or a combination device or a component that can implement a function of the terminal device. The apparatus may be installed in the terminal device. In embodiments of the present disclosure, the chip system may include a chip, or may include a chip and another discrete device. In the technical solutions provided in embodiments of the present disclosure, the technical solutions provided in embodiments of the present disclosure are described by using an example in which the apparatus configured to implement the function of the terminal is the terminal device.

2. RAN

The RAN may include one or more RAN devices, and an interface between the RAN device and the terminal device may be a Uu interface (or referred to as an air interface). Certainly, in future communication, names of these interfaces may still be used, or may be replaced with other names. This is not limited in the present disclosure.

The RAN device is a node or a device that enables the terminal device to access the radio network. The RAN device may also be referred to as an access network device or a base station. The access network device includes, for example, but is not limited to, a next-generation NodeB (gNB), an evolved NodeB (eNB), a radio network controller (RNC), a NodeB (NB), a base station controller (BSC), a base transceiver station (BTS), a home base station (HeNB or HNB), a baseband unit (BBU), a transmission reception point (TRP), a transmission point (TP), or a mobile switching center in a 5G communication system.

In embodiments of the present disclosure, an apparatus configured to implement a function of the access network device may be the access network device, or may be an apparatus that can support the access network device in implementing the function, for example, a chip system or a combination device or a component that can implement a function of the access network device. The apparatus may be installed in the access network device. In the technical solutions provided in embodiments of the present disclosure, the technical solutions provided in embodiments of the present disclosure are described by using an example in which the access network device is the apparatus for implementing the function of the access network device.

For example, communication between the RAN device and the terminal device is performed in accordance with a specific protocol layer structure. For example, a control plane protocol layer structure may include a radio resource control (RRC) layer, a packet data convergence protocol (PDCP) layer, a radio link control (RLC) layer, a media access control (MAC) layer, and a physical layer. A user plane protocol layer structure may include a PDCP layer, an RLC layer, a MAC layer, and a physical layer. In a possible implementation, a service data adaptation protocol (SDAP) layer may be further included above the PDCP layer.

In an example, the RAN device may include one or more central units (CUs) and one or more distributed units (DUs), and a plurality of DUs may be centrally controlled by one CU. For example, an interface between the CU and the DU may be referred to as an F1 interface. A control plane (CP) interface may be an F1-C interface, and a user plane (UP) interface may be an F1-U interface. Division may be performed for the CU and the DU based on protocol layers of a wireless network. For example, as shown in FIG. 2a, functions of a PDCP layer and protocol layers above the PDCP layer are set on the CU, and functions of protocol layers (for example, an RLC layer and a MAC layer) below the PDCP layer are set on the DU.

It may be understood that division of processing functions of the CU and the DU based on the protocol layers is merely an example, and the processing functions of the CU and the DU may alternatively be divided in another manner. For example, the functions of the protocol layers above the PDCP layer are set on the CU, and the functions of the PDCP layer and the protocol layers below the PDCP layer are set on the DU. For another example, the CU or the DU may have functions of more protocol layers. For another example, the CU or the DU may have some processing functions of a protocol layer. In a design, some functions of the RLC layer and functions of protocol layers above the RLC layer are set on the CU, and remaining functions of the RLC layer and functions of protocol layers below the RLC layer are set on the DU. In another design, division of functions of the CU or the DU may be performed based on service types or other system requirements. For example, division may be performed based on latencies. Functions whose processing time needs to satisfy a latency requirement are set on the DU, and functions whose processing time does not need to satisfy the latency requirement are set on the CU. In another design, the CU may alternatively have one or more functions of the core network. For example, the CU may be set on a network side for ease of centralized management; and the DU may have a plurality of radio frequency functions, or the radio frequency functions may be set remotely. This is not limited in embodiments of the present disclosure.

For example, the functions of the CU may be implemented by one entity or different entities. For example, as shown in FIG. 2b, functions of a CU may be further divided, that is, a control plane and a user plane are separated, and are implemented by using different entities: a control plane CU entity (namely, a CU-CP entity) and a user plane CU entity (namely, a CU-UP entity). The CU-CP entity and the CU-UP entity may be coupled to a DU, to jointly complete a function of a RAN device. An interface between the CU-CP entity and the CU-UP entity may be an E1 interface, an interface between the CU-CP entity and the DU may be an F1-C interface, and an interface between the CU-UP entity and the DU may be an F1-U interface. One DU and one CU-UP may be connected to one CU-CP. Under control of a same CU-CP, one DU may be connected to a plurality of CU-UPs, and one CU-UP may be connected to a plurality of DUs.

Figure 2A:
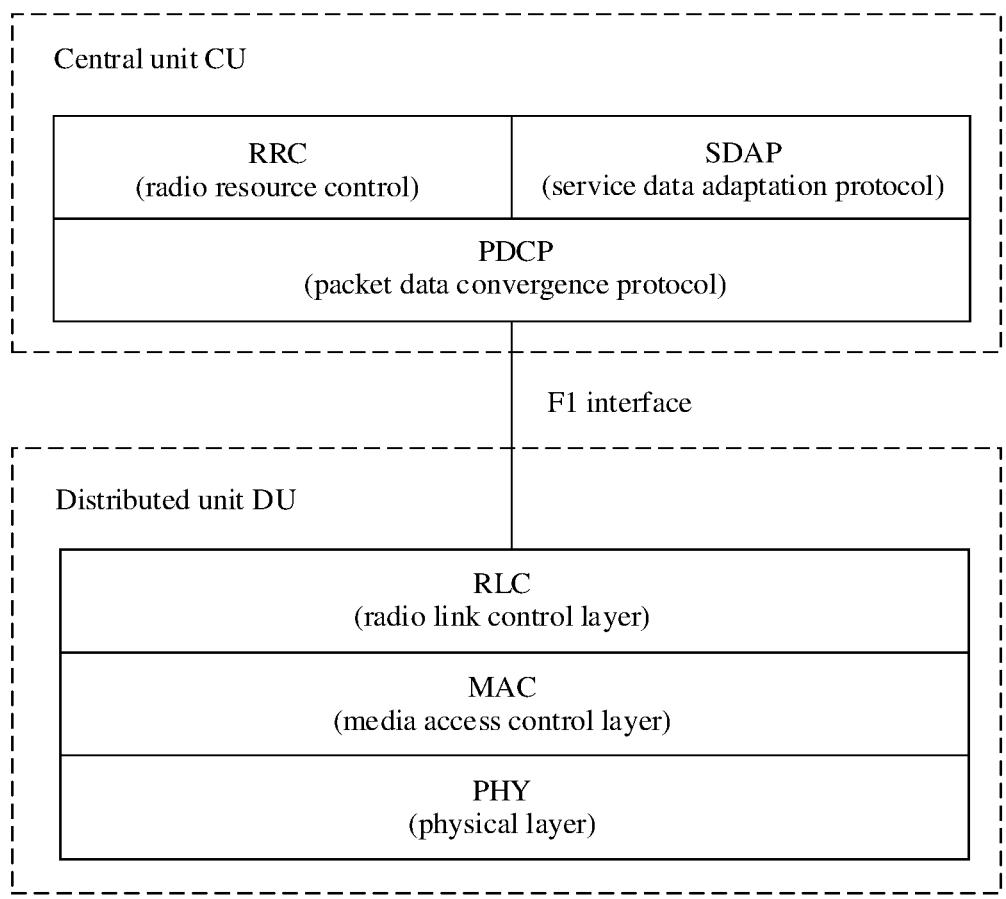
FIG. 2a is a schematic diagram of a CU-DU split architecture according to an embodiment of the present disclosure.
Figure 2B:
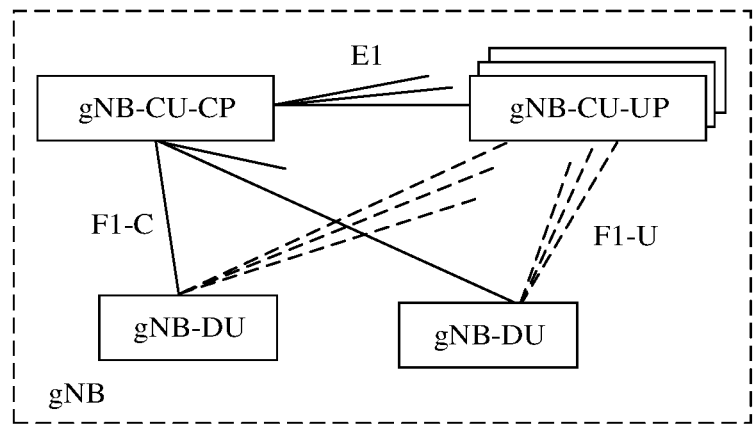
FIG. 2b is a schematic diagram of another CU-DU split architecture according to an embodiment of the present disclosure.

It should be noted that in the architectures shown in FIG. 2a and FIG. 2b, signaling generated by the CU may be sent to the terminal device via the DU, or signaling generated by the terminal device may be sent to the CU via the DU. The DU may transparently transmit the signaling to the terminal device or the CU by directly encapsulating the signaling at a protocol layer without parsing the signaling. In the following embodiments, if transmission of the signaling between the DU and the terminal device is described, sending or receiving the signaling by the DU is applicable to the scenario. For example, signaling at the RRC layer or the PDCP layer is finally processed as data at a physical layer and sent to the terminal device, or is converted from received data at a physical layer. In this architecture, the signaling of the RRC or the PDCP layer may also be considered to be sent by the DU, or sent by the DU and a radio frequency apparatus.

3. CN

The CN may include one or more core network devices or core network elements. Using a 5G communication system as an example, the CN may include an access and mobility management function (AMF) network element, a session management function (SMF) network element, a user plane function (UPF) network element, a policy control function (PCF) network element, a unified data management (UDM) network element, an application function (AF) network element, and the like.

The AMF network element is a control plane network element provided by the operator network, and is responsible for access control and mobility management for accessing the operator network by the terminal device, for example, including functions such as mobility status management, allocation of a temporary user identity, and user authentication and authorization.

The SMF network element is a control plane network element provided by an operator network and is responsible for managing a PDU session of the terminal device. The PDU session is a channel used to transmit a PDU, and the terminal device needs to transmit a PDU to the DN through the PDU session. The SMF network element is responsible for establishment, maintenance, deletion, and the like of the PDU session. The SMF network element includes functions related to a session, for example, session management (for example, session establishment, modification, and release, including tunnel maintenance between the UPF and the RAN), selection and control of the UPF network element, service and session continuity (SSC) mode selection, and roaming.

The UPF network element is a gateway provided by an operator, and is a gateway for communication between the operator network and the DN. The UPF network element includes functions related to a user plane, for example, data packet routing and transmission, packet detection, quality of service (QOS) processing, lawful interception, uplink packet detection, and downlink data packet storage.

The PCF network element is a control plane function provided by the operator, and is configured to provide a policy of the PDU session for the SMF network element. The policy may include a charging-related policy, a QoS-related policy, an authorization-related policy, and the like.

The UDM network element is a control plane network element provided by an operator, and is responsible for storing information such as a subscriber permanent identifier (SUPI) and subscription data of a subscriber in an operator network.

The AF network element is a function network element configured to provide various business services and can interact with a core network through another network element and interact with a policy management framework to perform policy management.

In addition, although not shown, the CN may further include other possible network elements, for example, a network exposure function (NEF) network element or a unified data repository (UDR) network element.

In embodiments of the present disclosure, an apparatus configured to implement a function of the core network device may be the core network device, or may be an apparatus that can support the core network device in implementing the function, for example, a chip system or a combination device or a component that can implement a function of the core network device. The apparatus may be installed in the core network device. In the technical solutions provided in embodiments of the present disclosure, the technical solutions provided in embodiments of the present disclosure are described by using an example in which the core network device is the apparatus for implementing the function of the core network device.

It should be noted that the access network device and the core network device in embodiments of the present disclosure may be collectively referred to as a network device. In other words, the network device may include the access network device and/or the core network device.

In FIG. 1, Npcf, Nudm, Naf, Namf, Nsmf, N1, N2, N3, N4, and N6 are interface sequence numbers. For meanings of these interface sequence numbers, refer to related standard protocols. This is not limited herein.

It may be understood that a 5G communication system is used as an example in FIG. 1. The solutions in embodiments of the present disclosure may alternatively be applied to another possible communication system, for example, a future 6th generation (6G) communication system. The foregoing network elements or functions may be network elements in a hardware device, may be software functions run on dedicated hardware, or may be instantiated virtualization functions on a platform (for example, a cloud platform). Optionally, the foregoing network elements or the functions may be implemented by one device, may be implemented by a plurality of devices, or may be one functional module in one device. This is not specifically limited in embodiments of the present disclosure.

In the foregoing network architecture shown in FIG. 1, in a communication process between a terminal device and a network device, the network device is usually used as a center, that is, the network device controls configuration of most or all parameters. Generally, after a problem occurs in communication between the terminal device and the network device, a manufacturer of the terminal device usually relies on traversing various possible problems to locate and resolve the problem, which is time consuming and inefficient.

However, in actual problem processing, the manufacturer of the terminal device finds that some problems are caused by incompatibility between the terminal device and the network device, and even some problems may occur repeatedly on different access network devices for a long time. For example, in a process in which the terminal device communicates with the access network device, a problem such as an access failure often occurs. In addition, in a process in which the terminal device communicates with the core network device, a problem such as a registration failure often occurs. In some possible scenarios, the access failure or the registration failure is caused by incompatibility between a capability of the access network device or the core network device and a capability of the terminal device. However, when the access failure or the registration failure occurs, it is usually unknown whether the access failure or the registration failure is caused by communication incompatibility. As a result, this type of problem cannot be efficiently resolved.

Based on this, this embodiment of the present disclosure provides a communication method, to resolve the problem of incompatibility between the terminal device and the network device.

In this embodiment, there may be a plurality of cases in which the terminal device is incompatible with the network device. In a possible case, a protocol version supported by the terminal device is different from a protocol supported by the access network device, and/or a protocol version supported by the terminal device is different from a protocol supported by the core network device. For example, the terminal device normally accesses through an LTE access network device side. However, after the LTE access network device sends a secondary base station addition request message to a 5G access network device, the 5G access network device returns a reject message, and a cause value carried in the reject message is that an air interface resource is unavailable. After analysis, it is found that the protocol version supported by the terminal device is later than a protocol version supported by the 5G access network device, which causes a failure in parsing capability information of the terminal device by the 5G access network device, thereby causing an access failure of the terminal device.

For this case, this embodiment provides a solution 1: The terminal device receives an identifier of a filtering protocol version from the access network device, and sends first capability information of the terminal device to the access network device based on the filtering protocol version. In this method, the terminal device may report capability information based on the filtering protocol version sent by the access network device. Compared with a manner in which the terminal device directly reports the capability information, this method can effectively reduce a communication problem caused by mismatch between the protocol version supported by the terminal device and the protocol version supported by the access network device and/or the protocol version supported by the core network device.

In another possible case, capability information reported by the terminal device does not match cached capability information of the access network device, and/or capability information reported by the terminal device does not match cached capability information of the core network device. For example, after the terminal device reports a measurement report to the access network device, the access network device does not deliver a handover command message, which causes a handover failure. After analysis, it is found that air interface capability information reported by the terminal device to the access network device is 348 bytes, and a container of the access network device can store capability information of a maximum of 300 bytes. Therefore, the access network device fails to parse the capability information of the terminal device, and cannot deliver a handover command.

For this case, this embodiment provides a solution 2: The terminal device receives the cached capability information from the access network device, and sends first capability information to the access network device based on the cached capability information. In this method, the terminal device may report capability information based on the cached capability information sent by the access network device. Compared with a manner in which the terminal device directly reports the capability information, this method can effectively reduce a communication problem caused by mismatch between the capability information reported by the terminal device and the cached capability information of the access network device and/or the cached capability information of the core network device.

In addition, this embodiment further provides a solution 3: The terminal device receives product version information from a first access network device, and sends first capability information to the first access network device based on the product version information. In this method, the terminal device may report capability information based on the product version information sent by the access network device. Compared with a manner in which the terminal device directly reports the capability information, this method can effectively reduce a communication problem caused by incompatibility between the terminal device and the access network device and/or the core network device.

The following describes in detail the communication method provided in this embodiment.

Embodiment 1

In Embodiment 1, a possible implementation of the communication method is described based on the foregoing solution 1.

Figure 3:
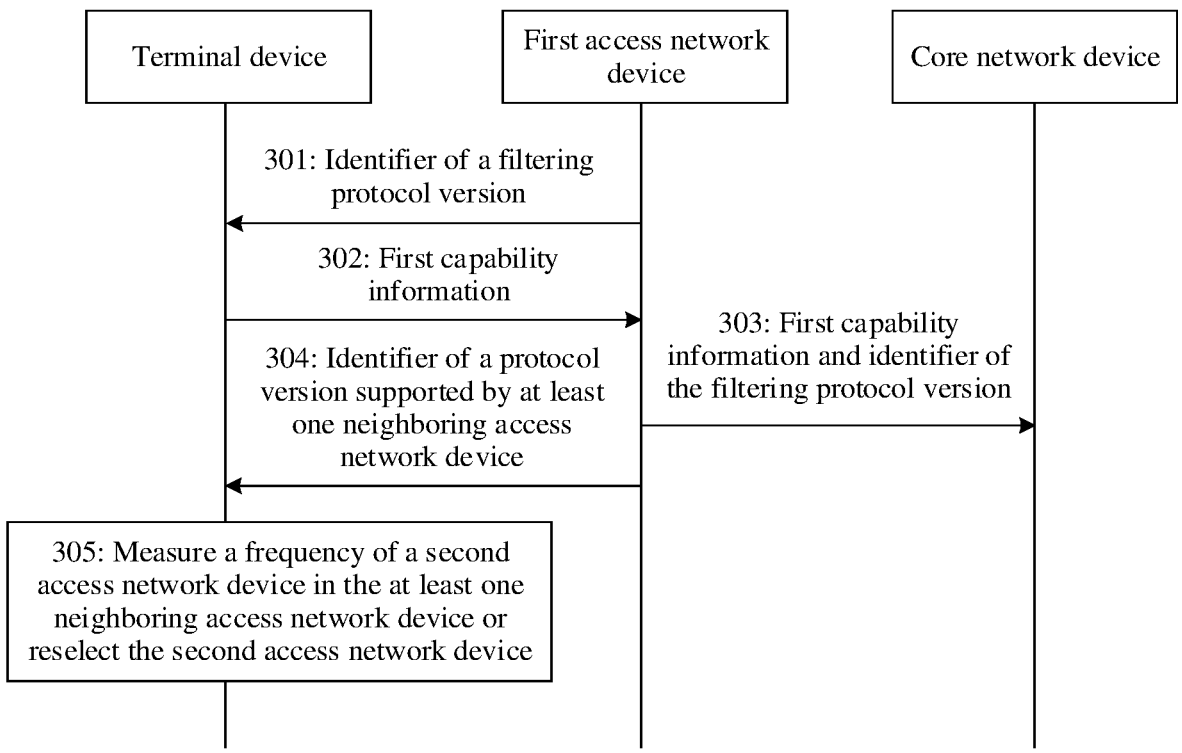
FIG. 3 is a schematic flowchart corresponding to a communication method according to Embodiment 1 of the present disclosure.

FIG. 3 is a schematic flowchart corresponding to a communication method according to Embodiment 1 of the present disclosure. As shown in FIG. 3, the method may include the following steps.

Step 301: A first access network device sends an identifier of a filtering protocol version to a terminal device, and correspondingly the terminal device may receive the identifier of the filtering protocol version.

Herein, related technical features related to the filtering protocol version are described.
(1) Filtering Protocol Version For example, the filtering protocol version may be used by the terminal device to filter capability information of the terminal device, or may be used by the terminal device to determine capability information compatible with the first access network device and/or a core network device.

In an example, the filtering protocol version may include a protocol version supported by the first access network device and/or a protocol version supported by the core network device. The protocol version may also be referred to as a standard version, for example, a release of a 3rd generation partnership project (3GPP) standard, such as R15 and R16, or may be a version of a 3GPP standard, such as v15.1.0 and v16.2.0.

In another example, the filtering protocol version may be earlier than a protocol version supported by the first access network device and/or a protocol version supported by the core network device.

It should be noted that in this embodiment, if the protocol version is supported by the first access network device, it may be understood that the first access network device supports a feature of the protocol version, or the first access network device supports parsing of protocol signaling corresponding to the protocol version. If the protocol version is supported by the core network device, it may be understood that the core network device supports a feature of the protocol version, or the core network device supports parsing of protocol signaling corresponding to the protocol version.

(2) Identifier of the Filtering Protocol Version

The identifier of the filtering protocol version may be information used to identify the filtering protocol version, for example, may be a protocol version number or other possible information of the filtering protocol version. This is not specifically limited. In this embodiment, any information that can distinguish between different filtering protocol versions may be understood as the identifier of the filtering protocol version.

(3) Manner in which the First Access Network Device Sends the Identifier of the Filtering Protocol Version The first access network device may send the identifier of the filtering protocol version in a plurality of manners. For example, the first access network device may send the identifier of the filtering protocol version to the terminal device by using a system message. For another example, the first access network device may send the identifier of the filtering protocol version to the terminal device in an RRC connection setup process. In this case, the identifier of the filtering protocol version may be carried in any one of an RRC connection setup message, an RRC connection resume message, and an RRC connection reestablishment message. For another example, the first access network device may send the identifier of the filtering protocol version to the terminal device after an RRC connection is set up. In this case, the identifier of the filtering protocol version may be carried in a capability query message or another possible message. For another example, the first access network device may send the identifier of the filtering protocol version to the terminal device in a handover process. In this case, the first access network device may be understood as a source access network device of the terminal device, and the identifier of the filtering protocol version may be carried in a handover command message.

Herein, for several possible examples described in the handover scenario, refer to Example 1 to Example 3.

Example 1

The first access network device may send, to a target access network device, the identifier of the filtering protocol version (referred to as a filtering protocol version 1 for ease of description) corresponding to the first access network device, where the filtering protocol version 1 may be carried in a handover request message. After receiving the filtering protocol version 1, the target access network device determines whether an identifier of a filtering protocol version (referred to as a filtering protocol version 2 for ease of description) corresponding to the target access network device is the same as the filtering protocol version 1. If they are different, the target access network device may send the filtering protocol version 2 to the first access network device. For example, the target access network device sends a handover request acknowledgment message to the first access network device, where the handover request acknowledgment message may carry the filtering protocol version 2. Further, after receiving the handover request acknowledgment message, the first access network device may send a handover command message to the terminal device, where the handover command message carries the identifier of the filtering protocol version (that is, the filtering protocol version 2).

In addition, if the filtering protocol version 2 is the same as the filtering protocol version 1, the target access network device may send the filtering protocol version 2 to the first access network device or may not send the filtering protocol version 2 to the first access network device. For example, the target access network device sends a handover request acknowledgment message to the first access network device, where the handover request acknowledgment message may carry the filtering protocol version 2 or may not carry the filtering protocol version 2. Further, after receiving the handover request acknowledgment message, the first access network device may send a handover command message to the terminal device, where the handover command message carries the identifier of the filtering protocol version (that is, the filtering protocol version 1 or the filtering protocol version 2).

Example 2

The first access network device may send a handover request message (which does not carry the identifier of the filtering protocol version corresponding to the first access network device, that is, a filtering protocol version 1) to a target access network device. After receiving the handover request message, the target access network device may send a handover request acknowledgment message to the first access network device. The handover request acknowledgment message may carry an identifier of a filtering protocol version corresponding to the target access network device, that is, a filtering protocol version 2. Further, after receiving the handover request acknowledgment message, the first access network device may send a handover command message to the terminal device, where the handover command message carries the identifier of the filtering protocol version (that is, the filtering protocol version 2).

Example 3

In the foregoing Example 1 or Example 2, after receiving the filtering protocol version 2 from the target access network device, the first access network device may determine whether the filtering protocol version 2 is the same as the filtering protocol version 1. If yes, the first access network device may send a handover command message to the terminal device, where the handover command message may indicate that the filtering protocol version 2 is the same as the filtering protocol version 1, and a specific indication manner is not limited. If not, the first access network device may send a handover command message to the terminal device, where the handover command message carries the filtering protocol version 2.

In addition, if the first access network device is not an access network device accessed by the terminal device for the first time, the first access network device may further receive historical capability information of the terminal device and an identifier of a historical filtering protocol version from the core network device, and determine whether the filtering protocol version is the same as the historical filtering protocol version. If the filtering protocol version is different from the historical filtering protocol version, the first access network device may send the identifier of the filtering protocol version to the terminal device. If the filtering protocol version is the same as the historical filtering protocol version, the first access network device may not send the identifier of the filtering protocol version to the terminal device. In this case, the first access network device may use the historical capability information corresponding to the historical filtering protocol version as the capability information of the terminal device, so that air interface resources can be effectively reduced.

Step 302: The terminal device sends first capability information of the terminal device to the first access network device based on the filtering protocol version, and correspondingly the first access network device may receive the first capability information.

In this embodiment, a protocol version supported by the terminal device may be equal to the filtering protocol version, or may be later than the filtering protocol version, or may be earlier than the filtering protocol version. After the terminal device receives the filtering protocol version, if determining that the protocol version supported by the terminal device is earlier than or equal to the filtering protocol version, the terminal device may report capability information actually supported by the terminal device (that is, the first capability information is the capability information actually supported by the terminal device): or if determining that the protocol version supported by the terminal device is later than the filtering protocol version, the terminal device may perform capability fallback, and report fell-back capability information (that is, the first capability information). In this case, a protocol version corresponding to the first capability information is earlier than the protocol version supported by the terminal device.

In an example, when the filtering version is later than the historical filtering version, the first capability information may include incremental information relative to the historical capability information reported by the terminal device based on the historical filtering protocol version. Herein, the historical filtering version may be a filtering version corresponding to an identifier, of a filtering version, previously received by the terminal device. In this case, after reporting the first capability information, the terminal device may update the historical filtering version based on the current filtering version. Alternatively, the terminal device may store one or more historical filtering versions, and the historical filtering version may be the latest historical filtering version in the plurality of historical filtering versions. In this case, after reporting the first capability information, the terminal device may use the current filtering version as a new historical filtering version.

In an optional manner of this example, the first access network device may send indication information to the terminal device, where the indication information indicates to report the capability information in an incremental manner. For example, the indication information may include the identifier of the historical filtering version. Correspondingly, after receiving the indication information, the terminal device reports the first capability information (that is, incremental information relative to the historical capability information reported by the terminal device based on the historical filtering version) based on the indication information. The indication information and the identifier of the filtering version may be carried in a same message, or may be carried in different messages. This is not specifically limited.

In an example, after receiving the filtering version, the terminal device may determine whether the filtering version is the same as the historical filtering version. If determining that the filtering protocol version is different from the historical filtering protocol version, the terminal device may actively send the first capability information to the first access network device (for example, the terminal device does not receive the capability query message from the first access network device, but because the filtering version is different from the historical filtering version, the terminal device may actively report the first capability information).

If the filtering protocol version is the same as the historical filtering protocol version, the terminal device may not send the first capability information to the first access network device, thereby reducing signaling overheads. In addition, when the terminal device does not send the first capability information to the first access network device, the first access network device may obtain corresponding capability information of the terminal device from the core network device.

In this embodiment, the terminal device may further send first information to the first access network device. The first information may include at least one of the following: (1) an identifier of the protocol version corresponding to the first capability information: (2) an identifier of the protocol version supported by the terminal device; and (3) indication information, where the indication information indicates that the protocol version supported by the terminal device is later than, earlier than, or equal to the filtering protocol version.

In an example, the first capability information and the first information may be carried in a same message, or may be carried in different messages. This is not specifically limited. For example, both the first capability information and the first information may be carried in a capability reporting message, or the first capability information is carried in the capability reporting message, and the first information is carried in another possible message.

Step 303: The first access network device sends the first capability information and the identifier of the filtering protocol version to the core network device, and correspondingly the core network device may receive the first capability information and the identifier of the filtering protocol version.

For example, the core network device may store the first capability information and the identifier of the filtering protocol version, and store a correspondence between the first capability information and the identifier of the filtering protocol version. For example, the first access network device may further send the first information to the core network device, and then the core network device may store the first information.

Subsequently, when the terminal device accesses another access network device, the another access network device may obtain the historical capability information, the identifier of the historical filtering protocol version, and the first information from the core network device, and perform a corresponding operation based on the information.

For example, the another access network device obtains, from the core network device, historical capability information 1, an identifier (for example, R16) of the historical filtering protocol version corresponding to the historical capability information, and an identifier (for example, R15) of the protocol version supported by the terminal device. In this case, if a filtering protocol version corresponding to the another access network device is R17, the identifier of the filtering protocol version may no longer be sent to the terminal device. In this case, the first access network device may use the historical capability information 1 as the capability information of the terminal device.

For another example, the another access network device obtains, from the core network device, historical capability information 1, an identifier (for example, R16) of the historical filtering protocol version corresponding to the historical capability information, and indication information (indicating that the protocol version supported by the terminal device is earlier than the historical filtering protocol version R16). In this case, if a filtering protocol version corresponding to the another access network device is R17, the identifier of the filtering protocol version may no longer be sent to the terminal device. In this case, the first access network device may use the historical capability information 1 as the capability information of the terminal device.

In addition, the method may further include the following steps.

Step 304: The first access network device sends, to the terminal device, one or more identifiers of one or more protocol versions supported by at least one neighboring access network device of the first access network device, and correspondingly the terminal device may receive the one or more identifiers of the one or more protocol versions supported by the at least one neighboring access network device.

For example, the one or more identifiers of the one or more protocol versions supported by the at least one neighboring access network device is/are carried in an RRC connection release message or a system message.

Step 305: The terminal device measures a frequency of a second access network device in the at least one neighboring access network device or reselecting the second access network device based on the one or more identifiers of the one or more protocol versions supported by the at least one neighboring access network device, where a protocol version supported by the second access network device is later than or equal to the protocol version supported by the terminal device.

In other words, the first access network device sends the one or more identifiers of the one or more protocol versions supported by the at least one neighboring access network device to the terminal device, so that the terminal device can preferably reselect the second access network device or preferably measure the second access network device, to avoid a subsequent incompatibility problem, or avoid capability fallback of the terminal device, to ensure service performance of the terminal device.

In the foregoing method, the first access network device may send the identifier of the filtering protocol version to the terminal device in the RRC connection setup process, after the RRC connection is set up, or by using the system message, so that the terminal device can report the capability information based on the identifier of the filtering protocol version. For example, when the protocol version supported by the network device does not match the protocol version supported by the terminal device, the terminal device may perform targeted processing (for example, perform targeted capability fallback). Compared with a case in which the terminal device needs to make many capability reduction attempts to ensure normal access or registration because the terminal device does not know the filtering protocol version, the method can effectively improve access or registration efficiency of the terminal device.

Embodiment 2

In Embodiment 2, a possible implementation of the communication method is described based on the foregoing solution 2.

Figure 4:
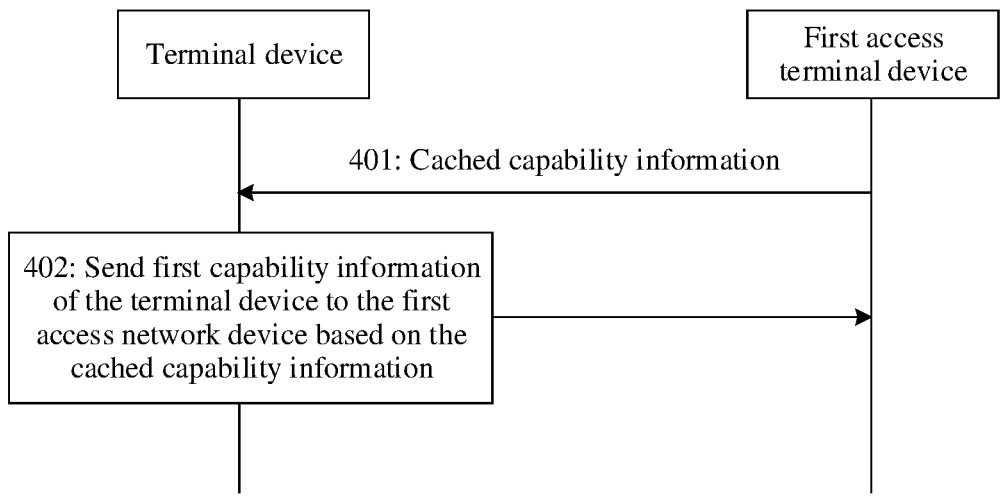
FIG. 4 is a schematic flowchart corresponding to a communication method according to Embodiment 2 of the present disclosure.

FIG. 4 is a schematic flowchart corresponding to a communication method according to Embodiment 2 of the present disclosure. As shown in FIG. 4, the method may include the following steps.

Step 401: An access network device sends cached capability information to a terminal device, and correspondingly the terminal device may receive the cached capability information.

Herein, the access network device may send the cached capability information to the terminal device in a plurality of manners. For example, the access network device may send the cached capability information by using a capability query message, an RRC connection setup message, an RRC connection resume message, an RRC connection reestablishment message, a handover command message, or a system message. For related implementation, refer to the manner in which the first access network device sends the identifier of the filtering protocol version in Embodiment 1. Details are not described again.

For example, the cached capability information may include cached capability information of the access network device and/or cached capability information of a core network device. The cached capability information of the access network device indicates a size of cache space for storing capability information of the terminal device by the access network device, and the cached capability information of the core network device indicates a size of cache space for storing capability information of the terminal device by the core network device. When the cached capability information includes the cached capability information of the core network device, the core network device may send the cached capability information of the core network device to the access network device in advance.

Step 402: The terminal device sends first capability information to the access network device based on the cached capability information.

In an example, when the cached capability information includes the cached capability information of the access network device, the first capability information may include access stratum capability information, and an amount of data included in the access stratum capability information is less than or equal to the size of cache space for storing the capability information of the terminal device by the access network device. The access stratum capability information of the terminal device may be capability information that needs to be exchanged between the terminal device and the access network device.

In still another example, when the cached capability information includes the cached capability information of the core network device, the first capability information may include access stratum capability information and network layer capability information, and an amount of data included in the first capability information is less than or equal to the size of the cache space for storing the capability information of the terminal device by the core network device. The network layer capability information of the terminal device may be capability information that needs to be exchanged between the terminal device and the core network device.

In this embodiment, a specific manner in which the terminal device determines, based on the cached capability information, to-be-reported first capability information depends on internal implementation of the terminal device. This is not specifically limited.

In the foregoing method, the access network device may send the cached capability information to the terminal device, so that the terminal device can report the capability information based on the cached capability information. For example, when the size of the cache space of the network device does not match the capability information of the terminal device, the terminal device may perform targeted processing (for example, delete the capability information).

Embodiment 3

In Embodiment 3, a possible implementation of the communication method is described based on the foregoing solution 3.

Figure 5:
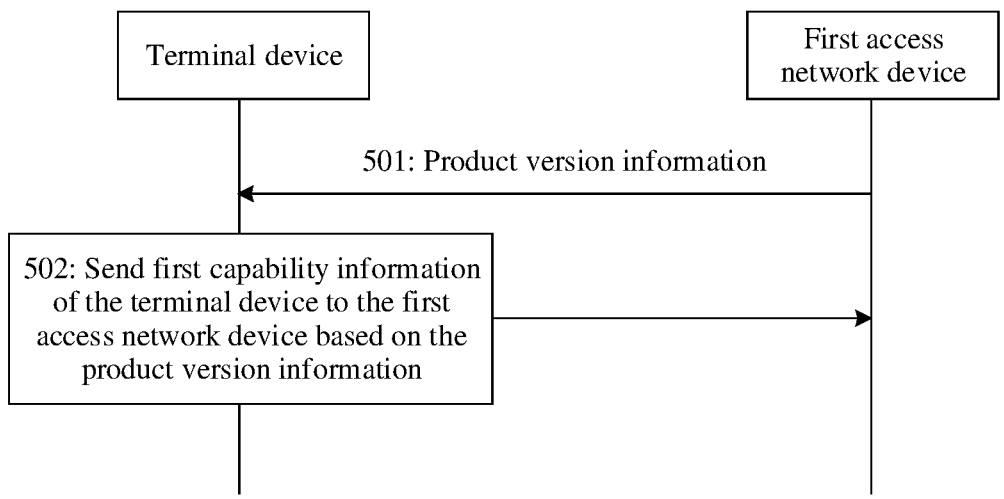
FIG. 5 is a schematic flowchart corresponding to a communication method according to Embodiment 3 of the present disclosure.

FIG. 5 is a schematic flowchart corresponding to a communication method according to Embodiment 3 of the present disclosure. As shown in FIG. 5, the method may include the following steps.

Step 501: A first access network device sends product version information to a terminal device, and correspondingly the terminal device receives the product version information.

Herein, the first access network device may send the product version information to the terminal device in a plurality of manners. For example, the first access network device may send the product version information by using a capability query message, an RRC connection setup message, an RRC connection resume message, an RRC connection reestablishment message, a handover command message, or a system message. For related implementation, refer to the manner in which the first access network device sends the identifier of the filtering protocol version in Embodiment 1. Details are not described again.

Step 502: The terminal device sends first capability information of the terminal device to the first access network device based on the product version information.

In an example, the product version information includes product version information of the first access network device. In this case, the first capability information is determined based on historical communication information between the terminal device and a second access network device, and product version information of the second access network device is the same as product version information of a first core network device. The historical communication information between the terminal device and the second access network device includes at least one of the following: connection setup failure information, handover failure information, dual connectivity setup failure information, RRC connection reestablishment failure information, RRC connection resume failure information, SCG addition failure information, SCG change failure information, reconfiguration compatibility detection failure information, and reconfiguration failure information.

For example, the product version information of the access network device is a code, a model, or a sequence number used to identify the access network device, or may be a code, a model, or a sequence number that is of the access network device and is allocated according to a specific standard criterion. For example, the product version information of the access network device may include manufacturer information of the access network device and information about a network to which the access network device belongs. For example, the product version information of the access network device may include at least one of the following: manufacturer information of the access network device, information about a network to which the access network device belongs, information about an area to which the access network device belongs, and software version information of the access network device.

In still another example, the product version information includes product version information of the first core network device, the first capability information is determined based on historical communication information between the terminal device and a second core network device, and a product version of the second core network device is the same as a product version of the first core network device. The historical communication information between the terminal device and the second core network device includes registration failure information.

For example, the product version information of the core network device is similar to the product version information of the access network device. For details, refer to the foregoing descriptions. For example, the product version information of the core network device may include at least one of the following: manufacturer information of the core network device, information about a network to which the core network device belongs, information about an area to which the core network device belongs, and software version information of the core network device.

In still another example, the product version information may include product version information of the first access network device and product version information of the first core network device. In this case, for related implementation, refer to the descriptions of the foregoing two examples.

In the foregoing method, when the product version information of the first access network device is the same as the product version information of the second access network device, the terminal device may determine the first capability information based on the historical communication information between the terminal device and the second access network device, and report the first capability information to the first access network device, so that a problem of incompatibility between the terminal device and the first access network device can be effectively avoided by using the historical communication information. In addition, compared with a case in which the terminal device needs to make many capability reduction attempts to ensure normal access or registration because the terminal device does not know the product version information, the method can effectively improve access or registration efficiency of the terminal device.

It should be noted that the foregoing Embodiment 1 to Embodiment 3 may be separately implemented, or may be implemented in combination. Based on Embodiment 1 to Embodiment 3, the following describes a procedure of the communication method provided in embodiments of the present disclosure with reference to some specific embodiments (for example, Embodiment 4 to Embodiment 6).

In the following Embodiment 4 to Embodiment 6, an access network device 1 may be an access network device initially accessed by the terminal device, and an access network device 2 may be a new access network device accessed by the terminal device again based on a service requirement after the terminal device exits from the access network device 1 for a specific time. The access network device 1 and the access network device 2 may be access network devices of a same core network device (for example, an AMF network element), or may be access network devices of different core network devices. This is not specifically limited. The core network device in this embodiment may include the AMF network element, or may include another possible network element such as an SMF network element or a UPF network element. This is not specifically limited.

Embodiment 4

Figure 6A:
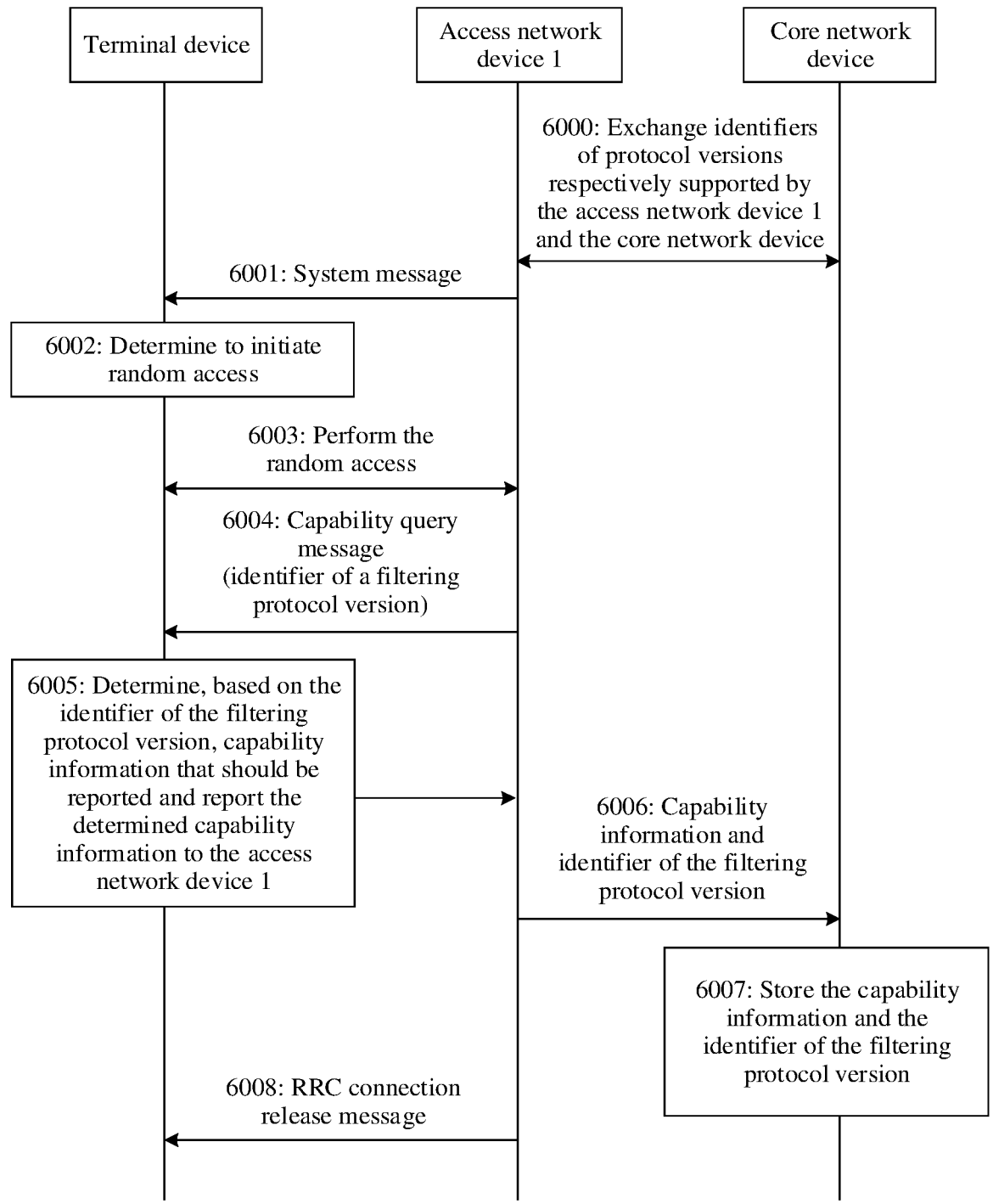
FIG. 6a is a schematic flowchart corresponding to a communication method according to Embodiment 4 of the present disclosure.

FIG. 6a is a schematic flowchart corresponding to a communication method according to Embodiment 4 of the present disclosure. The communication method relates to an access network device 1. As shown in FIG. 6a, the method may include the following steps.

Step 6000: The access network device 1 and a core network device may exchange identifiers of protocol versions respectively supported by the access network device 1 and the core network device.

For example, the core network device may send the identifier of the protocol version supported by the core network device to the access network device 1.

Step 6001: The access network device 1 sends a system message, where the system message includes configuration information, and the configuration information may be used to configure a random access preamble and/or a random access resource.

Step 6002: The terminal device receives the system message sent by the access network device 1, and determines, based on the configuration information in the system message, to initiate random access to the access network device 1.

Step 6003: The terminal device performs the random access (or initial access) to the access network device 1.

For example, in this step, the terminal device first sends the random access preamble to the access network device 1, and then receives a random access response message from the access network device 1. After receiving the random access response message, the terminal device sends a random access message 3 to the access network device 1. In an initial connection setup phase, the random access message 3 includes an RRC connection setup request message. Then, the terminal device receives a random access message 4 (namely, a contention resolution message) from the access network device 1, and the random access message 4 may include an RRC connection setup message.

Step 6004: After the terminal device successfully accesses the access network device 1, if the access network device 1 determines that capability information of the terminal device needs to be requested from the terminal device, the access network device 1 sends a capability query message to the terminal device.

Optionally, the capability query message may include an identifier of a filtering protocol version determined by the access network device 1, where the filtering protocol version may be a protocol version supported by the access network device 1 and/or a protocol version supported by the core network device.

Optionally, the capability query message may further include cached capability information of the access network device 1 and/or cached capability information of the core network device. The cached capability information of the access network device 1 and/or the core network device may be a size of cache space for storing the capability information of the terminal device by the access network device 1 and/or the core network device.

Optionally, the capability query message may further include product version information of the access network device 1 and/or product version information of the core network device.

Step 6005: The terminal device determines, based on the identifier of the filtering protocol version delivered by the access network device 1, capability information that should be reported, and reports the determined capability information to the access network device 1.

For example, the terminal device determines, based on the filtering protocol version, the latest protocol version that can be supported by the capability information reported by the terminal device, where the protocol version should be earlier than or equal to the filtering protocol version provided in the capability query message. For example, if a protocol version supported by the terminal device is equal to or later than the filtering protocol version, the terminal device determines that the capability information reported by the terminal device is capability information that can be supported by the terminal device and that corresponds to the filtering protocol version; or the capability information that can be reported by the terminal device is capability information that can be supported by the terminal device and that corresponds to the filtering protocol version, and capability information that can be further supported by the terminal device under the filtering protocol version and whose one or more features meet a Release X+N condition. N represents a feature that can be implemented by the terminal device in advance in a protocol version N later than X. In this case, the terminal device determines, based on the Release X+N, the capability information that should be reported. In other words, compared with the Release X, the terminal device further needs to report capability information of some specific features corresponding to the protocol version N. For another example, if a protocol version supported by the terminal device is earlier than the filtering protocol version, the terminal device reports actual capability information of the terminal device, for example, capability information currently supported by the terminal device.

For example, if the latest protocol version that can be actually supported by the terminal device is R17, and the filtering protocol version provided in the capability query message is R16, the terminal device determines, based on R16 (or a protocol version earlier than R16), the capability information that should be reported by the terminal device. If the protocol version that can be actually supported by the terminal device is R15, and the filtering protocol version provided in the capability query message is R16, the terminal device determines, based on R15 (or a protocol version earlier than R15), the capability information that should be reported by the terminal device.

For another example, if the protocol version that can be actually supported by the terminal device is v17.1.0, and the filtering protocol version provided in the capability query message is v16.2.0, the terminal device determines, based on v16.2.0 (or earlier than v16.2.0), the capability information that should be reported by the terminal device. However, if the protocol version that can be actually supported by the terminal device is v15.8.0, and the filtering protocol version provided in a capability query message is v16.2.0, the terminal device determines, based on v15.8.0 (or earlier than v15.8.0), the capability information that should be reported by the terminal device.

Optionally, if the capability query message further provides the cached capability information of the access network device 1 and/or the cached capability information of the core network device, the terminal device may further determine, based on the cached capability information of the access network device 1 and/or the cached capability information of the core network device, the capability information that should be reported, to ensure that the capability information reported by the terminal device does not exceed the size of the cache space of the access network device 1 and/or the core network device.

Optionally, if the capability query message further provides the product version information of the access network device 1 and/or the core network device, the terminal device may determine, based on the product version information, a historical communication status, a historical communication exception, or the like of the terminal device on a device corresponding to the product version information, the capability information that needs to be reported. For example, when the terminal device once communicates with access network devices or core network devices with same product version information, if an evolved universal terrestrial radio access (E-UTRA) and new radio (NR) dual connectivity (EN-DC) fails to be set up, or an 18-bit PDCP sequence number (SN) configuration is incompatible, the terminal device determines that the reported capability information does not include capability information supported by the EN-DC, or does not report a supported 18-bit PDCP SN.

In addition, the capability reporting message of the terminal device may further include the identifier of the filtering protocol version. Optionally, the capability reporting message of the terminal device may further include an identifier of a (latest) protocol version that can be supported by the terminal device.

Step 6006: The access network device 1 stores the capability information of the terminal device, and the access network device 1 notifies the core network device of the capability information of the terminal device and the identifier of the filtering protocol version.

Further, if the terminal device reports an identifier of the protocol version supported by the terminal device, the access network device 1 may further notify the core network device of the identifier of the protocol version supported by the terminal device.

Step 6007: The core network device stores the capability information of the terminal device and the identifier of the corresponding filtering protocol version.

In an example, the core network device may store the capability information of the terminal device based on the filtering protocol version.

Step 6008: After a service ends, the access network device 1 may send an RRC connection release message, where the RRC connection release message indicates the terminal device to exit a connected mode and enter an idle mode or an inactive mode.

For example, the RRC connection release message may include an identifier of a protocol version supported by a neighboring base station (or a neighboring cell or a neighboring frequency) of the access network device 1 for use of the terminal device in the idle mode or the inactive mode. For example, the terminal device may preferably measure, based on the identifier of the protocol version supported by the neighboring base station (or the neighboring cell or the neighboring frequency), a neighboring base station (or a neighboring cell or a neighboring frequency) whose protocol version is equal to that supported by the terminal device, or preferably measure a neighboring base station (or a neighboring cell or a neighboring frequency) whose protocol version is later than that supported by the terminal device.

In addition, when performing cell reselection, the terminal device may alternatively preferably select a neighboring cell whose protocol version is equal to that supported by the terminal device, or preferably select a neighboring cell whose protocol version is later than that supported by the terminal device. In addition, when performing core network device selection, the terminal device may preferably select a core network device whose protocol version is equal to that supported by the terminal device, or preferably select a core network device whose protocol version is later than that supported by the terminal device.

Figure 6B:
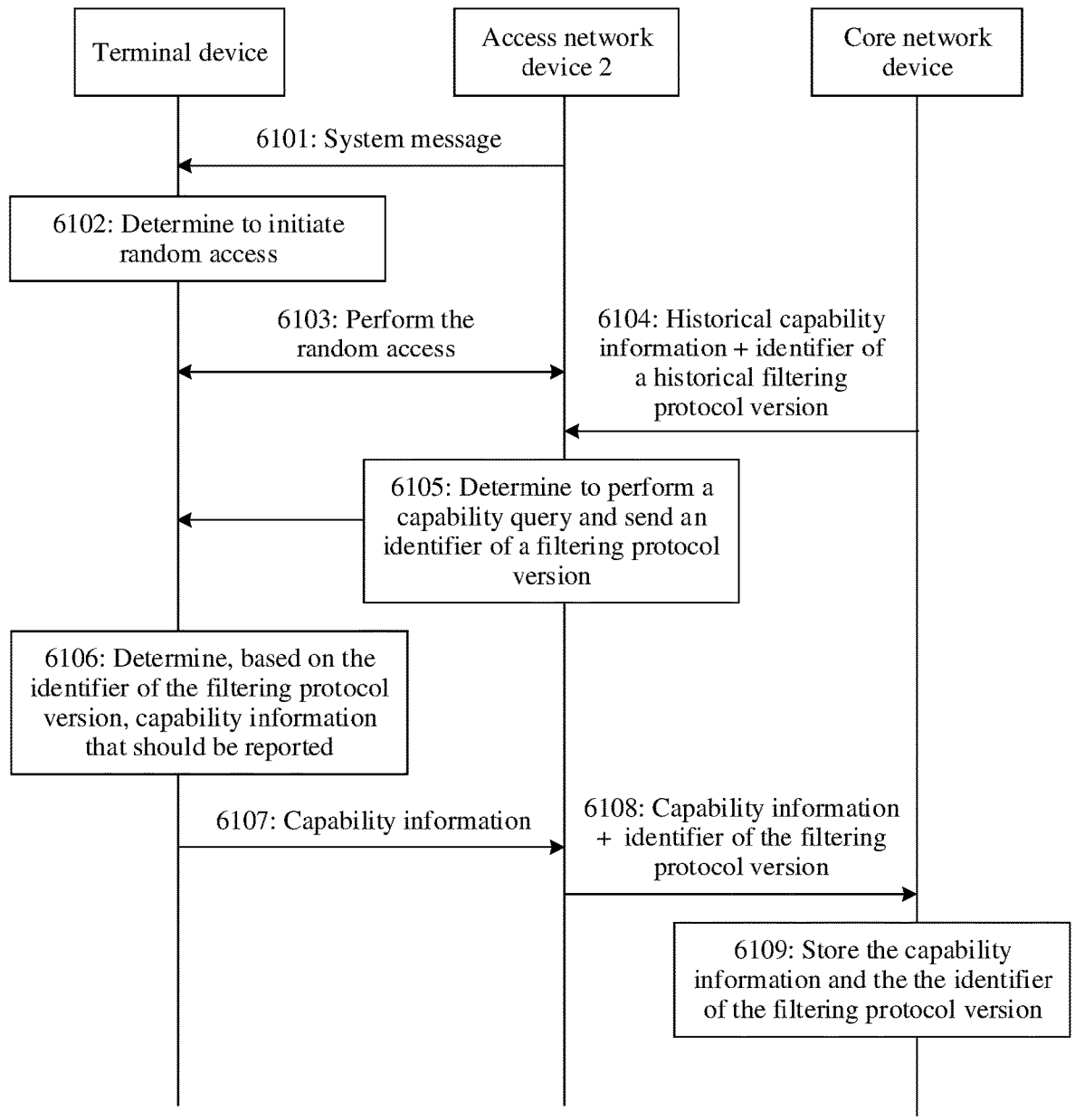
FIG. 6b is another schematic flowchart corresponding to a communication method according to Embodiment 4 of the present disclosure.

FIG. 6*b* is another schematic flowchart corresponding to a communication method according to Embodiment 4 of the present disclosure. The communication method relates to an access network device 2. As shown in FIG. 6*b*, the method may include the following steps.

Step 6101 to step 6103: A terminal device accesses the access network device 2.

Herein, for step 6101 to step 6103, refer to step 6001 to step 6003 in the initial access phase. After the terminal device successfully accesses the access network device 2, the access network device 2 may obtain capability information of the terminal device from a core network device.

For example, before step 6101, the access network device 2 and the core network device may exchange identifiers of protocol versions respectively supported by the access network device 2 and the core network device.

Step 6104: The core network device sends the capability information of the terminal device and an identifier of a filtering protocol version to the access network device 2.

Further, the access network device 2 and the terminal device may perform security mode activation. In a security mode activation process, the access network device 2 sends a security mode activation command to the terminal device, and then the terminal device feeds back a security mode activation complete message to the access network device 2 after generating a key.

Step 6105: The access network device 2 determines, based on a protocol version supported by the access network device 2 and/or a protocol version supported by the core network device, and the capability information of the terminal device and the identifier of the filtering protocol version provided by the core network device, whether to perform a new capability query.

For ease of description herein, the capability information of the terminal device provided by the core network device may be referred to as historical capability information, and the filtering protocol version provided by the core network device may be referred to as a historical filtering protocol version.

In an example, the historical filtering protocol version is a filtering protocol version corresponding to an access network device 1. If the protocol version supported by the access network device 2 is equal to the historical filtering protocol version, the access network device 2 may determine that a new capability query process does not need to be initiated. If the protocol version supported by the access network device 2 is later than the historical filtering protocol version, the access network device 2 may determine to initiate a new capability query process, and add a filtering protocol version corresponding to the access network device 2 to a capability query message, where the filtering protocol version may be earlier than or equal to the protocol version supported by the access network device 2.

In another possible example, the access network device 2 may also determine, based on the protocol version supported by the core network device and the historical filtering protocol version, whether to initiate a new capability query process: or the access network device 2 may determine, based on the protocol version supported by the access network device 2 and the protocol version supported by the core network device and the historical filtering protocol version, whether to initiate a new capability query process.

Step 6106: The terminal device determines, based on the identifier of the filtering protocol version delivered by the access network device 2 and the protocol version supported by the terminal device, capability information that should be reported.

In an example, for a manner in which the terminal device reports the capability information, refer to step 6004 and step 6005 in the initial access phase.

In still another example, a process in which the terminal device reports the capability information may alternatively be performed in a manner different from that in step 6004 and step 6005 in the initial access phase. For example, after receiving the capability query message delivered by the access network device 2, the terminal device may determine, based on the filtering protocol version identifier carried in the capability query message, to perform capability reporting in an incremental manner. Herein, the reporting the capability in an incremental manner may mean that the terminal device reports, based on a new filtering protocol version, only capability information that is different from that reported last time (that is, capability information that is determined based on the new filtering version and that is added relative to the previous filtering version).

For example, if the filtering version used during previous capability reporting of the terminal device is R15 (or v15.2.0), and the filtering protocol version indicated in the capability query message delivered by the access network device 2 is R16 (or v16.5.0), when reporting the capability information, the terminal device may report capability information additionally supported in R16 (or v16.5.0) compared with R15 (or v15.2.0).

In an optional manner of this example, the capability query message sent by the access network device 2 may carry indication information, to indicate the terminal device to perform capability reporting in an incremental manner.

Step 6107: The terminal device sends a capability reporting message to the access network device 2, where the capability reporting message includes capability information that should be reported and that is determined by the terminal device.

Herein, the capability reporting message may further include an identifier of the protocol version supported by the terminal device.

Step 6108: After receiving the capability information sent by the terminal device, the access network device 2 sends the capability information to the core network device.

Step 6109: The core network device stores new capability information.

For example, if the terminal device reports the capability information in an incremental manner, the core network device may store the capability information in an incremental manner. In other words, the core network device may correspondingly store incremental capability information that is based on different filtering protocol versions and that is received twice or a plurality of times.

Further, when the core network device subsequently provides the capability information of the terminal device for another access network device, the core network device may provide the capability information for the another access network device in an incremental manner. The another access network device may determine, based on increment-based capability information obtained from the core network device, whether to request the capability information from the terminal device.

Similarly, if a selected core network device changes when the terminal device accesses a new access network device, the access network device may determine, based on a protocol version supported by the new core network device, to trigger a new capability query process.

In the foregoing method, the access network device may send the identifier of the filtering protocol version to the terminal device by using the capability query message, and then the terminal device may report the capability information based on the filtering protocol version. First, compatibility between the terminal device and the network device can be effectively improved, and a communication problem caused by mismatch of protocol versions supported by the terminal device and the network device can be reduced. Second, the terminal device can be assisted in quickly and efficiently locating a problem, and the terminal device is prevented from performing an aimless capability reduction attempt. Third, after the security mode is activated, the access network device may provide the identifier of the filtering protocol version for the terminal device, so that information security can be ensured.

Embodiment 5

Figure 7A:
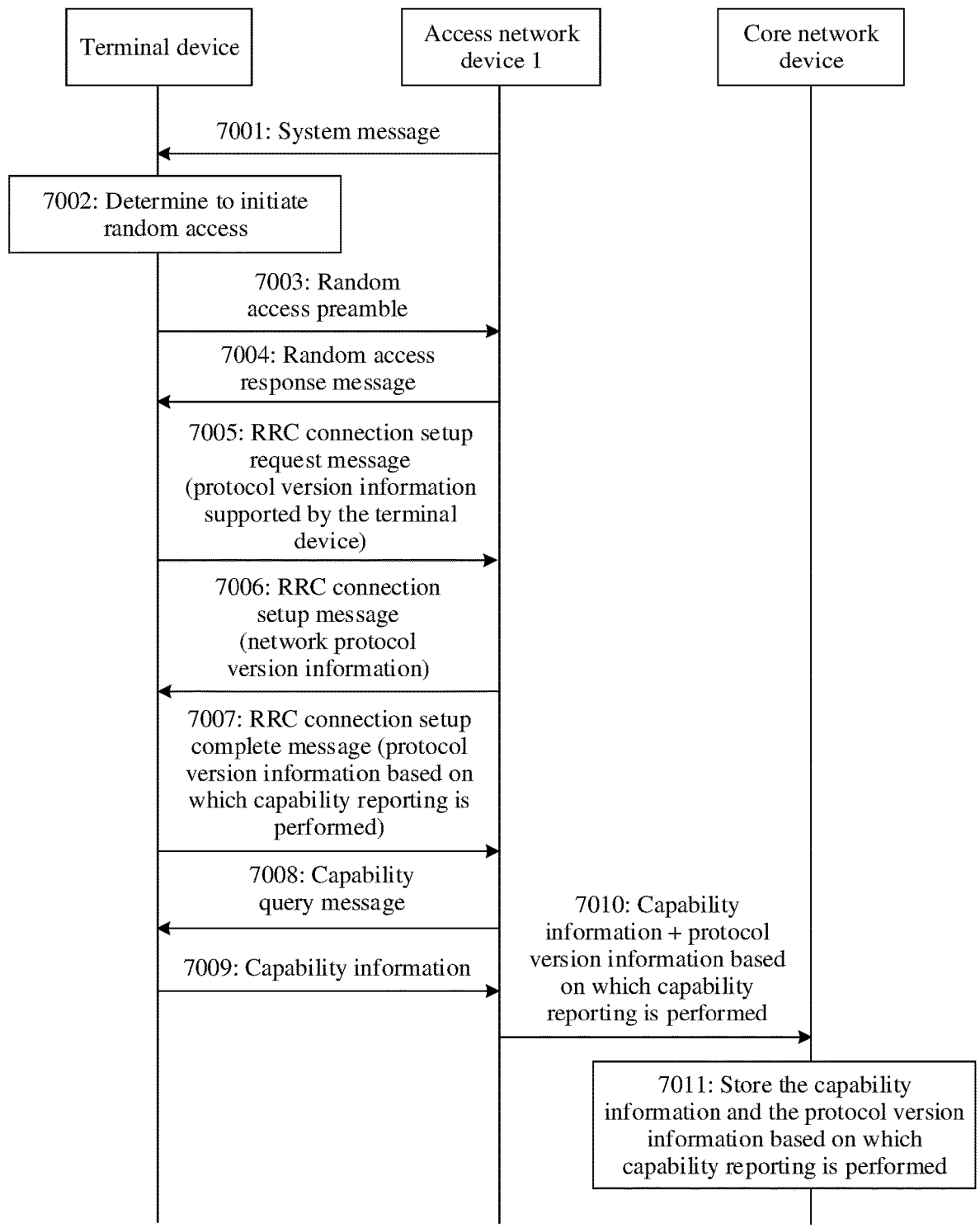
FIG. 7a is a schematic flowchart corresponding to a communication method according to Embodiment 5 of the present disclosure.

FIG. 7a is a schematic flowchart corresponding to a communication method according to Embodiment 5 of the present disclosure. The communication method relates to an access network device 1. As shown in FIG. 7a, the method may include the following steps.

Step 7001: The access network device 1 sends a system message, where the system message includes configuration information, and the configuration information may be used to configure a random access preamble and/or a random access resource.

Step 7002: The terminal device receives the system message sent by the access network device 1, and determines, based on the configuration information in the system message, to initiate random access to the access network device 1.

Step 7003: The terminal device performs the random access to the access network device 1.

For example, in this step, the terminal device first sends a random access preamble to the access network device 1.

Step 7004: The terminal device receives a random access response message from the access network device 1.

Step 7005: After receiving the random access response message, the terminal device sends a random access message 3 to the access network device 1. In an initial connection setup phase, the random access message 3 may include an RRC connection setup request message.

Optionally, the RRC connection setup request message may include protocol version information supported by the terminal device, for example, an identifier of a release and/or a version supported by the terminal device. It should be noted that the protocol version information in this embodiment may include an identifier of a protocol version.

Step 7006: The terminal device receives the RRC connection setup message sent by the access network device 1.

Herein, the RRC connection setup message includes network protocol version information or filtering protocol version information, for example, an identifier of a release and/or a version supported by the access network device 1. Optionally, the RRC connection setup message may also include an identifier of a release and/or a version supported by the core network device.

Optionally, the RRC connection setup message may also include product version information of the access network device 1 and/or the core network device. For example, the product version information of the access network device 1 may be coding information including a manufacturer ID, a network ID, and a software ID of the access network device 1. This is merely an example herein, and specific composition of the product version information is not limited in this embodiment.

Step 7007: The terminal device determines, based on the protocol version supported by the terminal device and the network protocol version information or the filtering protocol version information delivered by the access network device 1, protocol version information based on which the terminal device performs capability reporting, and notifies the access network device 1 of the protocol version information by using an RRC connection setup complete message. Alternatively, the RRC connection setup complete message may carry indication information 1 and/or indication information 2. The indication information 1 indicates that the version supported by the terminal device is later than (or earlier than or equal to) the protocol version supported by the access network device 1, and the indication information 2 indicates that the version supported by the terminal device is later than (or earlier than or equal to) the protocol version supported by the core network device.

Optionally, if step 7006 includes the product version information of the access network device 1 and/or the product version information of the core network device, the terminal device may determine, based on the product version information, a historical communication status, a historical communication exception, or the like of the terminal device on a device corresponding to the product version information, capability information that needs to be reported. For example, when the terminal device once communicates with access network devices or core network devices with same product version information, if an EN-DC fails to be set up, or an 18-bit PDCP SN configuration is incompatible, the terminal device determines that the reported capability information does not include capability information supported by the EN-DC, or does not report a supported 18-bit PDCP SN.

In addition, in a possible alternative solution, if the RRC connection setup request message in step 7005 includes the protocol version information supported by the terminal device, the terminal device and the access network device 1 may determine, according to a specific rule, a protocol version based on which the terminal device performs capability reporting. For example, the terminal device obtains a version (for example, may be a maximum version, a minimum version, or a specific version in an intersection set) in the intersection set of the protocol version supported by the access network device 1 and the protocol version supported by the terminal device as a protocol version based on which capability reporting is performed. In this case, the RRC connection setup complete message in step 7007 may no longer carry the protocol version information based on which the terminal device performs capability reporting.

In a possible alternative solution, if the RRC connection setup request message in step 7005 does not include the protocol version information supported by the terminal device, the RRC connection setup complete message in step 7007 needs to include protocol version information based on which the terminal device determines, based on the network protocol version information, that the terminal device performs capability reporting.

In a possible alternative solution, if the RRC connection setup request message in step 7005 does not include the protocol version information supported by the terminal device, the RRC connection setup complete message in step 7007 may include the protocol version information supported by the terminal device.

Step 7008: When determining that capability information of the terminal device needs to be queried, the access network device 1 sends a capability query message to the terminal device.

Step 7009: The terminal device sends a capability reporting message to the access network device 1, to report the capability information of the terminal device.

For example, the terminal device may determine to-be-reported capability information based on protocol version information based on which a negotiated capability reporting is performed: or the terminal device may determine to-be-reported capability information based on the network protocol version information delivered by the access network device 1 in step 7006.

Step 7010: The access network device 1 stores the capability information of the terminal device, and notifies the core network device of the capability information of the terminal device and the protocol version information based on which the capability reporting is performed. Alternatively, the access network device 1 notifies the core network device of the capability information of the terminal device and the indication information 1 and/or the indication information 2.

Further, if the terminal device reports the protocol version information supported by the terminal device, the access network device 1 may also notify the core network device of the protocol version information supported by the terminal device.

The protocol version information based on which the capability reporting is performed may be understood as protocol version information corresponding to the capability information of the terminal device.

Step 7011: The core network device stores the capability information of the terminal device and the protocol version information based on which capability reporting is performed. Alternatively, the core network device stores the capability information of the terminal device and the indication information 1 and/or the indication information 2.

Figure 7B:
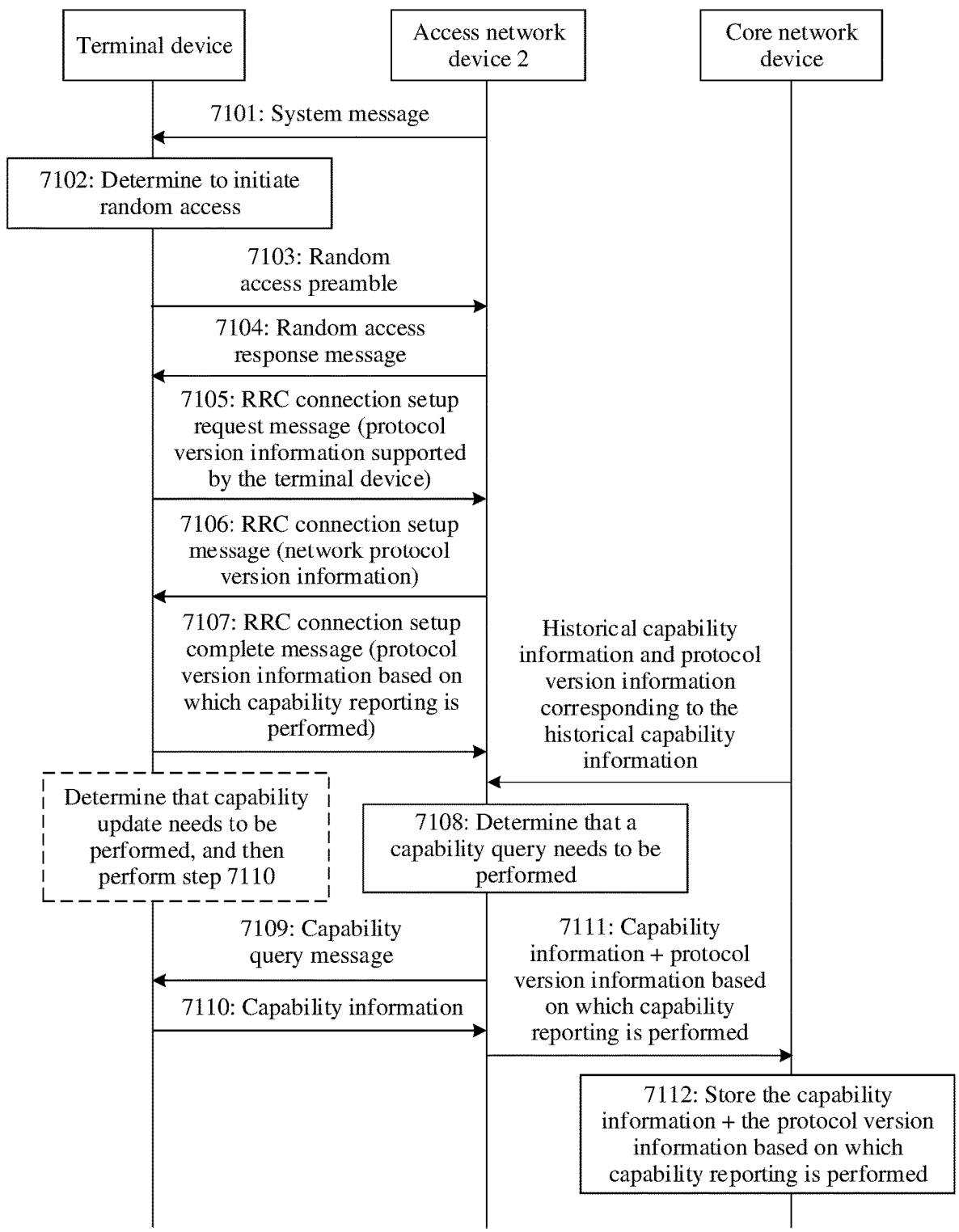
FIG. 7b is another schematic flowchart corresponding to a communication method according to Embodiment 5 of the present disclosure.

FIG. 7b is another schematic flowchart corresponding to a communication method according to Embodiment 5 of the present disclosure. The communication method relates to an access network device 2. As shown in FIG. 7b, the method may include the following steps.

Step 7101 to step 7105: A terminal device accesses a new access network device 2.

For step 7101 to step 7105, refer to step 7001 to step 7005 in the initial access phase.

Step 7106: The access network device 2 sends an RRC connection setup message to the terminal device.

Herein, the RRC connection setup message may include network protocol version information, or protocol version information that corresponds to capability information of the terminal device and that is stored on a network side (including at least a core network device). Specifically, the protocol version information may be different protocol version information corresponding to the capability information of the terminal device, or may be latest and earliest protocol version information corresponding to the capability information of the terminal device.

Step 7107: The terminal device sends an RRC connection setup complete message to the access network device 2.

Optionally, the RRC connection setup complete message may include protocol version information based on which the terminal device determines, based on the network protocol version information (that is, protocol version information supported by the access network device 2 and/or protocol version information supported by the core network device), that the terminal device performs capability reporting. Alternatively, the RRC connection setup complete message may include protocol version information supported by the terminal device.

Step 7108: The access network device 2 determines that a capability query needs to be performed again.

For example, the access network device 2 may obtain, from the core network device, at least one of historical capability information of the terminal device, protocol version information corresponding to the historical capability information, the protocol version information supported by the terminal device, indication information 1, and indication information 2. In addition, the access network device 2 may determine, based on the foregoing information obtained from the core network device, whether the capability query needs to be performed again. For example, a protocol version corresponding to the historical capability information is R15, a protocol version supported by the terminal device is R17, and a protocol version supported by the access network device 2 is R16. In this case, the access network device 2 may determine that the capability query needs to be performed again.

Step 7109: The access network device 2 sends a capability query message to the terminal device.

For example, the access network device 2 may indicate the terminal device to perform capability reporting in an incremental manner, that is, report capability information newly added compared with capability information reported last time.

It should be noted that step 7109 may be an optional step. In some possible cases, the access network device 2 may not send the capability query message.

Step 7110: The terminal device sends the capability information of the terminal device to the access network device 2.

In a possible alternative solution, the terminal device may determine, based on the network protocol version information or the protocol version information that corresponds to the capability information of the terminal device and that is stored on the network side, and the protocol version supported by the terminal device, that capability update of the terminal device needs to be performed. Further, the terminal device may initiate the capability update to the access network device 2 in step 7110, that is, report the capability information.

For example, if the terminal device determines that the protocol version supported by the terminal device is different from the protocol version supported by the network device, the terminal device may determine that the capability update needs to be performed. Alternatively, if the terminal device determines that the protocol version supported by the terminal device is different from the protocol version that corresponds to the capability information of the terminal device and that is stored on the network side, the terminal device may determine that the capability update needs to be performed.

Step 7111: The access network device 2 stores the capability information of the terminal device, and the access network device 2 may notify the core network device of the capability information of the terminal device and the protocol version information corresponding to the capability information of the terminal device.

Step 7112: The core network device stores the capability of the terminal device and the corresponding version information.

In the foregoing method, the access network device and the terminal device may exchange the protocol version information respectively supported by the access network device and the terminal device in an RRC connection setup process. First, compatibility between the terminal device and the network device can be effectively improved, and a communication problem caused by mismatch of protocol versions supported by the terminal device and the network device can be avoided. Second, the terminal device can be assisted in quickly and efficiently locating a problem, and the terminal device is prevented from performing an aimless capability reduction attempt.

Embodiment 6

Figures 1, 8A:
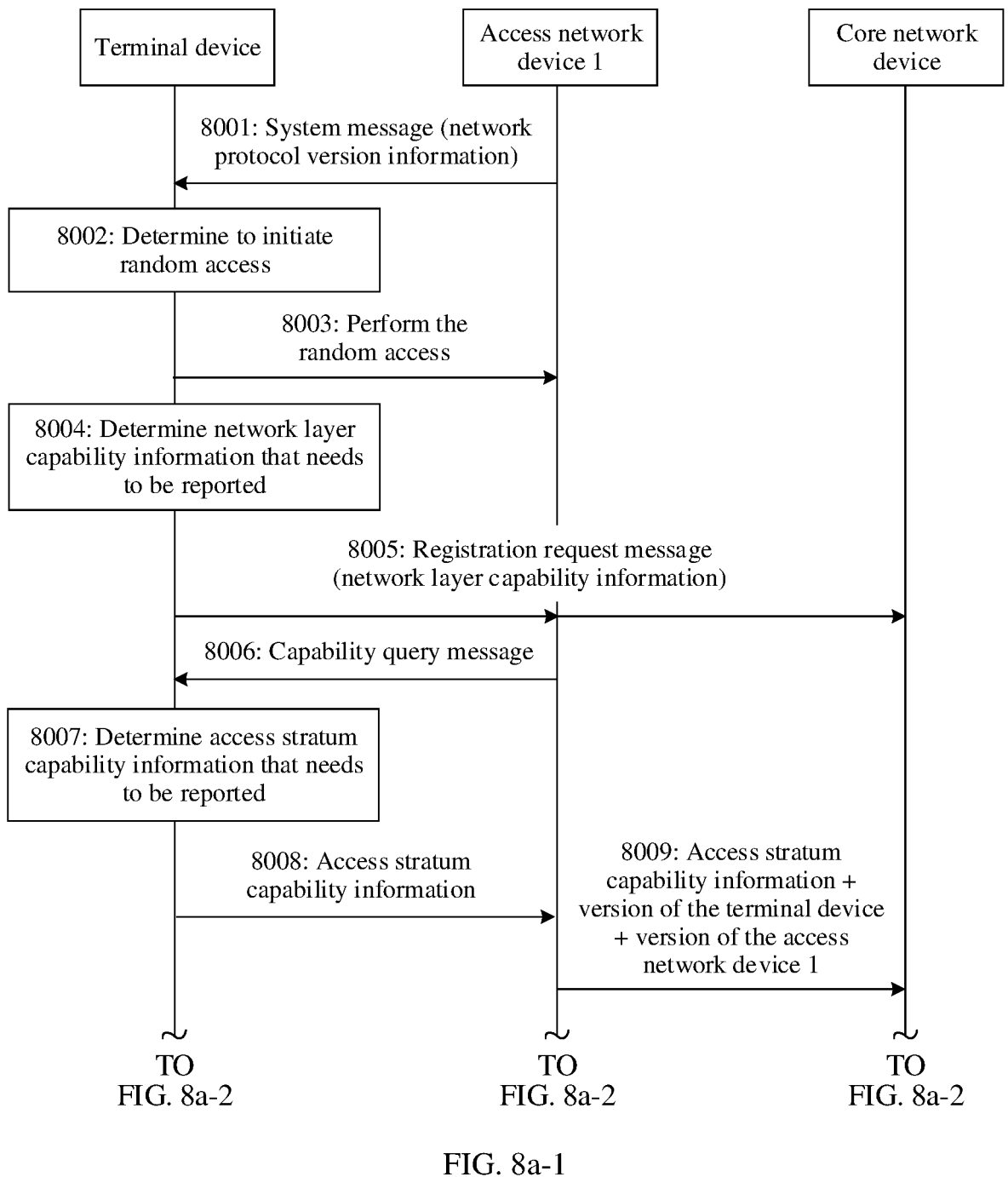
Figures 2, 8A:
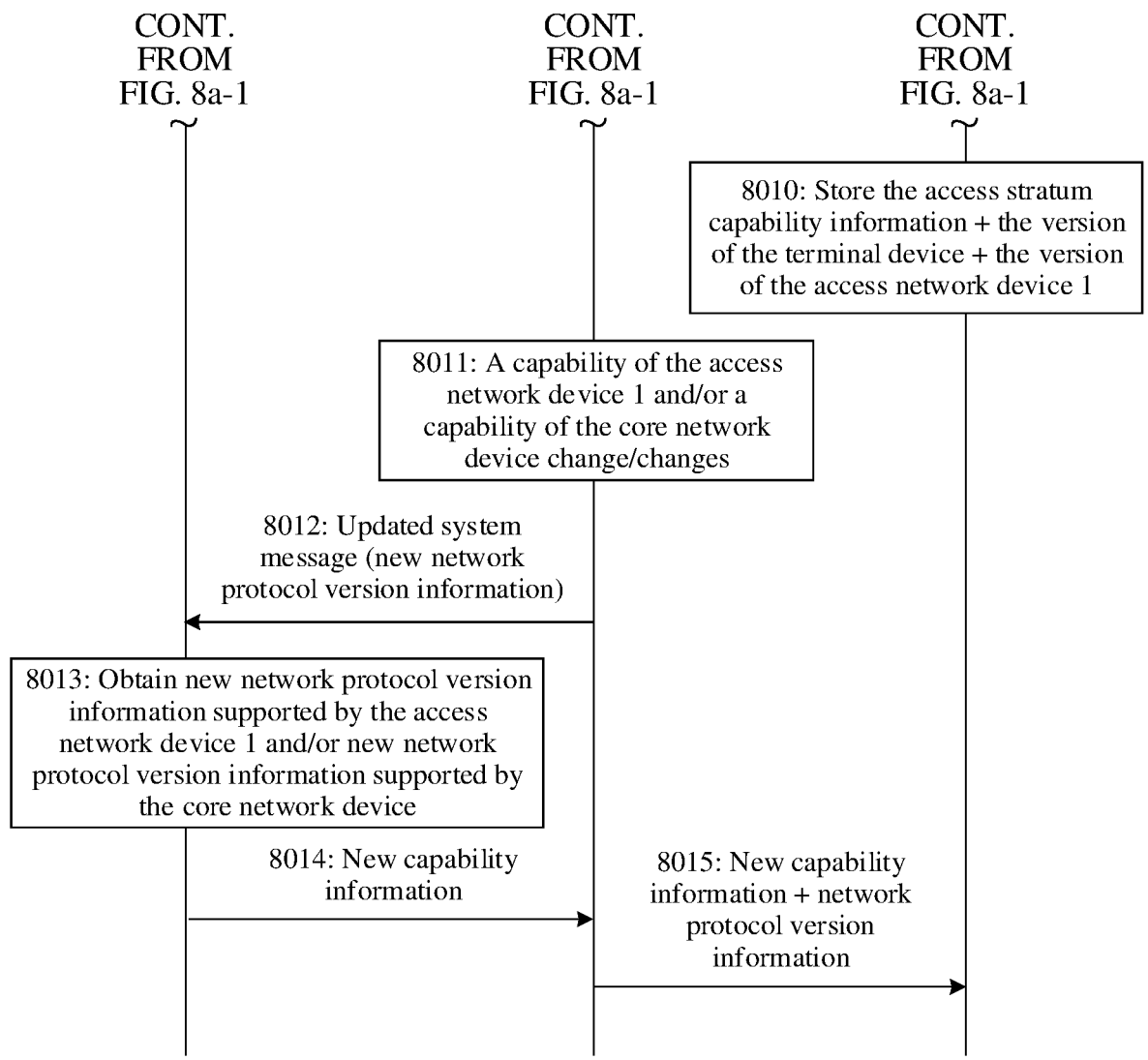

FIG. 8*a*-1 and FIG. 8*a*-2 are a schematic flowchart corresponding to a communication method according to Embodiment 6 of the present disclosure. The communication method relates to an access network device 1. As shown in FIG. 8*a*-1 and FIG. 8*a*-2, the method may include the following steps.

Step 8001: The terminal device receives a system message sent by the access network device 1.

Herein, the system message may include network protocol version information, and the network protocol version information may include protocol version information supported by the access network device 1 and/or version information supported by a core network device. For example, the protocol version information supported by the access network device 1 and/or the protocol version information supported by the core network device may be release information or version information.

Optionally, the system message may also include product version information of the access network device 1 and/or product version information of the core network device.

For step 8002 and step 8003, that is, random access, refer to the foregoing embodiment.

Step 8004: The terminal device determines, based on the protocol version information supported by the core network device, network layer capability information that needs to be reported.

Step 8005: The terminal device sends a registration request message to the core network device by using the access network device 1.

Herein, the registration request message may carry the network layer capability information determined by the terminal device and protocol version information corresponding to the network layer capability information.

For example, the access network device 1 and the terminal device perform a security mode activation procedure.

Step 8006: The access network device 1 sends a capability query message to the terminal device.

Step 8007: The terminal device determines, based on the protocol version information that is supported by the access network device 1 and that is provided in the system message, access stratum capability information to be reported by the terminal device.

Step 8008: The terminal device reports the determined access stratum capability information to the access network device 1.

For example, the terminal device may report one or more of the following to the access network device 1: (a) the access stratum capability information determined by the terminal device and protocol version information corresponding to the access stratum capability information; (b) the access stratum capability information determined by the terminal device, protocol version information corresponding to the access stratum capability information, and protocol version information supported by the terminal device; (c) the access stratum capability information determined by the terminal device, protocol version information corresponding to the access stratum capability information, and indication information (indicating that a protocol version supported by the terminal device is later than or earlier than a protocol version supported by the access network device 1); and (d)

the access stratum capability information determined by the terminal device and protocol version information supported by the terminal device.

Optionally, if the system message in step 8001 includes the product version information of the access network device 1 and/or the product version information of the core network device, the terminal device may determine, based on the product version information, a historical communication status, a historical communication exception, or the like of the terminal device on a device corresponding to the product version information, capability information that needs to be reported. For example, when the terminal device once communicates with access network devices or core network devices with same product version information, if an EN-DC fails to be set up, or an 18-bit PDCP SN configuration is incompatible, the terminal device determines that the reported capability information does not include capability information supported by the EN-DC, or does not report a supported 18-bit PDCP SN.

Step 8009: The access network device 1 sends, to the core network device, the information (for example, any one of (a) to (d)) reported by the terminal device in step 8008, and may further send, to the core network device, the protocol version information supported by the access network device 1.

Step 8010: The core network device correspondingly stores the foregoing information.

Step 8011: The access network device 1 determines that a capability of the access network device 1 and/or a capability of the core network device change/changes.

Herein, there may be a plurality of cases in which the access network device 1 determines that the capability of the access network device 1 and/or the capability of the core network device change/changes. For example, the access network device 1 receives an upgrade indication of the core network device, to indicate new protocol version information supported by the core network device. For another example, the access network device 1 determines that the supported protocol version changes, for example, is upgraded to support a new protocol version.

Step 8012: The access network device 1 updates the system message, and sends the updated system message to the terminal device.

For example, the access network device 1 may send a paging message to the terminal device, to indicate the terminal device to receive the updated system message. The updated system message may include new network protocol version information, and the new network protocol version information may include new protocol version information supported by the access network device 1 and/or the core network device.

Step 8013: The terminal device receives the updated system message, and obtains the new protocol version information supported by the access network device 1 and/or the core network device.

For example, the terminal device may store the new protocol version information supported by the access network device 1 and/or the core network device. Optionally, the updated system message may further include the product version information of the access network device 1 and/or the core network device.

Further, the terminal device may actively trigger a capability update, and for details, refer to step 8014: or the terminal device may not actively trigger a capability update, that is, may report new capability information after receiving the capability query message.

Step 8014: The terminal device reports the new capability information based on the new version information supported by the access network device 1 and/or the core network device.

Step 8015: The access network device 1 sends the new capability information and network version information to the core network device, and then the core network device may store the new capability information and the network version information.

It should be noted that the terminal device may report the new capability information in an incremental manner. Optionally, the access network device 1 may indicate, in the updated system message, the terminal device to perform capability reporting in an incremental manner.

Figure 8B:
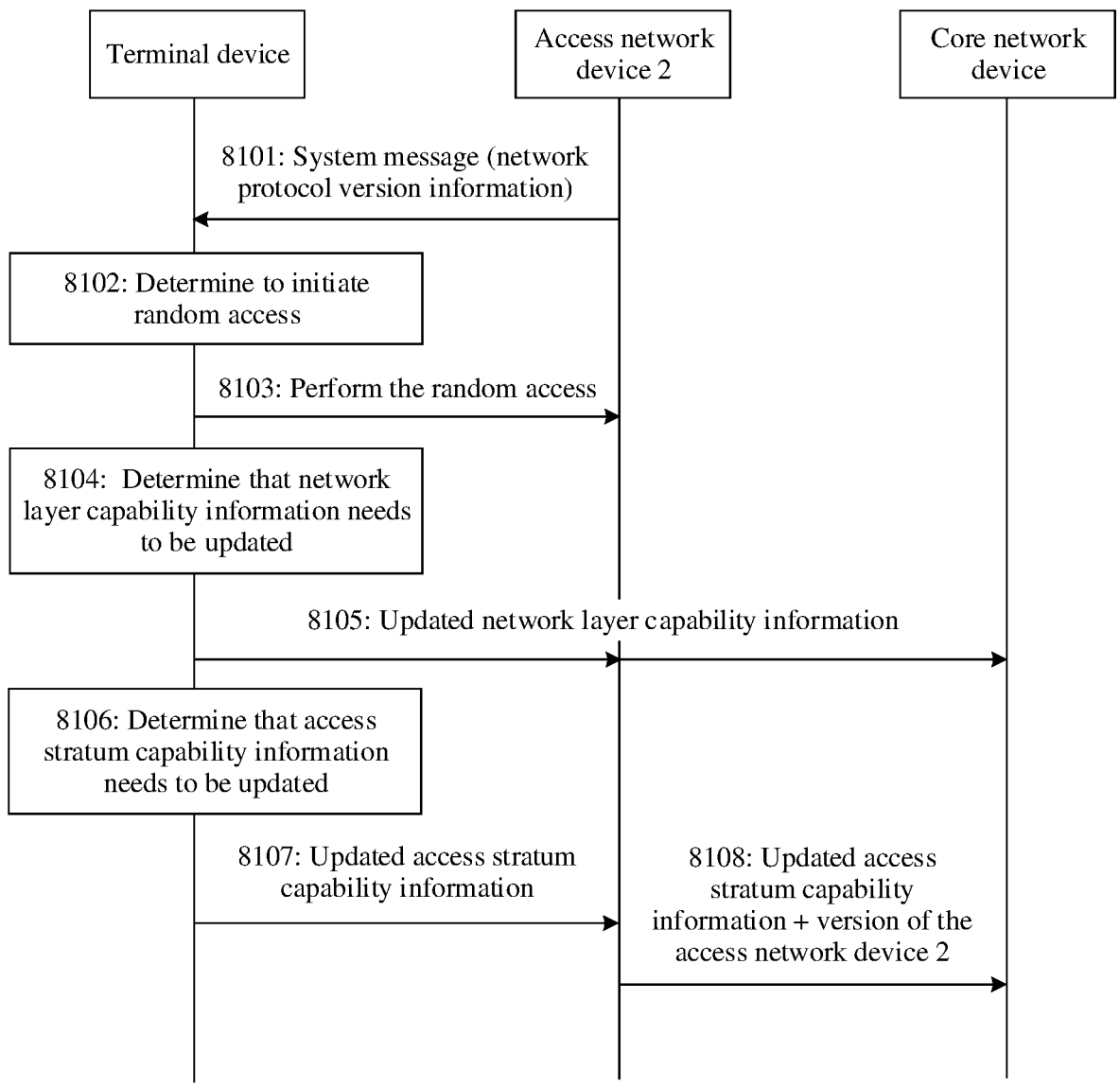
FIG. 8b is another schematic flowchart corresponding to a communication method according to Embodiment 6 of the present disclosure.

FIG. 8b is another schematic flowchart corresponding to a communication method according to Embodiment 6 of the present disclosure. The communication method relates to an access network device 2. As shown in FIG. 8b, the method may include the following steps.

Step 8101 to step 8103: A terminal device accesses the access network device 2. A specific procedure is the same as that in the initial access case.

Step 8104: The terminal device determines, based on a protocol version supported by a core network device, that network layer capability information of the terminal device needs to be updated.

Step 8105: The terminal device sends the updated network layer capability information to the core network device by using the access network device 2.

For example, the terminal device determines that the protocol version supported by the core network device is later than a historical protocol version corresponding to previous capability reporting, and then the terminal device may send the updated network layer capability information in a registration request message. The terminal device may report the updated network layer capability information in an incremental manner.

Step 8106: The terminal device determines that access stratum capability information of the terminal device needs to be updated.

Step 8107: The terminal device sends the updated access stratum capability information to the access network device 2.

For example, after the terminal device accesses the access network device 2, if the terminal device determines, based on a system message of the access network device 2, that a protocol version supported by the access network device 2 is different from a protocol version supported by the access network device 1, the terminal device may actively perform capability update, that is, actively report the updated access stratum capability information to the access network device 2.

Step 8108: The access network device 2 sends the updated access stratum capability information to the core network device, and may further send the protocol version information supported by the access network device 2 to the core network device.

In a possible alternative solution, step 8106 and step 8107 may also be replaced with:

Step 8106': The access network device 2 sends a capability query message to the terminal device.

For example, the access network device 2 may obtain historical access stratum capability information and historical protocol version information from the core network device. For example, the historical access stratum capability information may be access stratum capability information reported by the terminal device to the access network device 1, and the historical protocol version information may be protocol version information supported by the access network device 1. If determining that the protocol version supported by the access network device 2 is later than the historical protocol version, the access network device 2 may initiate a capability query, that is, send the capability query message to the terminal device.

Step 8107': After receiving the capability query message, the terminal device determines updated access stratum capability information based on the protocol version information supported by the access network device 2, and sends the updated access stratum capability information to the access network device 2.

For example, the terminal device may report the updated access stratum capability information in an incremental manner. The core network device and the access network device 2 may exchange capability information of the terminal device and store the capability information of the terminal device in an incremental manner. Optionally, the access network device 2 may add indication information to the capability query message, to indicate the terminal device to perform capability reporting in an incremental manner.

In the foregoing method, the access network device may send the network protocol version information to the terminal device by using the system message. First, compatibility between the terminal device and the network device can be effectively improved, and a communication problem caused by mismatch of protocol versions supported by the terminal device and the network device can be reduced. Second, the terminal device can be assisted in quickly and efficiently locating a problem, and the terminal device is prevented from performing an aimless capability reduction attempt.

For Embodiment 1 to Embodiment 6, it should be noted that:

(1) Step numbers in the flowcharts described in Embodiment 1 to Embodiment 6 are merely an example of an execution procedure, and do not constitute a limitation on an execution sequence of the steps. In embodiments of the present disclosure, there is no strict execution sequence between steps that do not have a time sequence dependency relationship with each other. In addition, not all the steps shown in the flowcharts are mandatory steps, and some steps may be added to or deleted from the flowcharts based on an actual requirement.

(2) The foregoing focuses on differences between different embodiments in Embodiment 1 to Embodiment 3 and differences between different embodiments in Embodiment 4 to Embodiment 6. For other content except the differences, mutual reference may be made between Embodiment 1 to Embodiment 6.

(3) Some messages in a 5G communication system are used in Embodiment 1 to Embodiment 6. However, during specific implementation, different messages or message names may be used. This is not limited in embodiments of the present disclosure.

The foregoing mainly describes the solutions provided in embodiments of the present disclosure from the perspective of device interaction. It may be understood that, to implement the foregoing functions, the access network device, the core network device, or the terminal device may include a corresponding hardware structure and/or a software module for performing each function. A person skilled in the art should easily be aware that, in combination with units and algorithm steps of the examples described in embodiments disclosed in this disclosure, embodiments of the present disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In embodiments of the present disclosure, the access network device, the core network device, or the terminal device may be divided into functional units based on the method examples. For example, each functional unit may be obtained through division based on each corresponding function, or two or more functions may be integrated into one unit. The integrated unit may be implemented in a form of hardware, or may be implemented in a form of a software functional unit.

Figure 9:
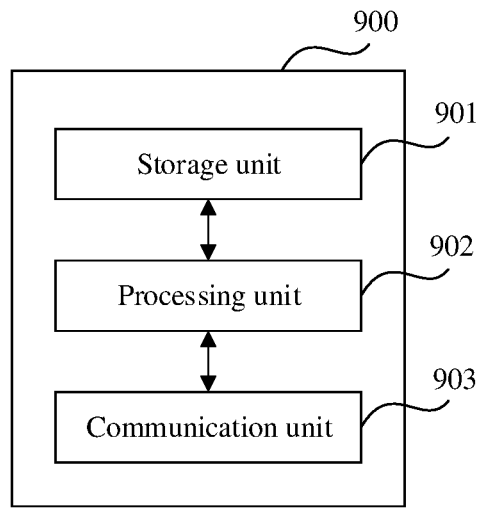
FIG. 9 is a possible schematic block diagram of an apparatus according to an embodiment of the present disclosure.

When the integrated unit is used, FIG. 9 is a possible example block diagram of an apparatus according to an embodiment of the present disclosure. As shown in FIG. 9, an apparatus 900 may include a processing unit 902 and a communication unit 903. The processing unit 902 is configured to control and manage an action of the apparatus 900. The communication unit 903 is configured to support communication between the apparatus 900 and another device. Optionally, the communication unit 903 is also referred to as a transceiver unit, and may include a receiving unit and/or a sending unit, respectively configured to perform a receiving operation and a sending operation. The apparatus 900 may further include a storage unit 901 that is configured to store program code and/or data of the apparatus 900.

The apparatus 900 may be the terminal device in the foregoing embodiments, or may be a chip disposed in the terminal device. The processing unit 902 may support the apparatus 900 in performing actions of the terminal device in the foregoing method examples. Alternatively, the processing unit 902 mainly performs an internal action of the terminal device in the method examples, and the communication unit 903 may support communication between the apparatus 900 and another device.

Specifically, in an embodiment, the communication unit 903 is configured to: receive an identifier of a filtering protocol version from a first access network device, and send first capability information of the terminal device to the first access network device based on the filtering protocol version.

In a possible design, a protocol version corresponding to the first capability information is earlier than or equal to the filtering protocol version.

In a possible design, the processing unit 902 is configured to: after determining, based on the filtering protocol version, that the filtering protocol version is different from a historical filtering protocol version, send the first capability information of the terminal device to the first access network device by using the communication unit 903.

In a possible design, the filtering protocol version is later than the historical filtering protocol version; and the first capability information includes incremental information relative to historical capability information reported by the terminal device based on the historical filtering protocol version.

In a possible design, the communication unit 903 is further configured to: receive indication information from the first access network device, where the indication information indicates to report capability information in an incremental manner.

In a possible design, the indication information includes an identifier of the historical filtering protocol version.

In a possible design, the communication unit 903 is further configured to: send at least one of the following to the first access network device: an identifier of a protocol version corresponding to the first capability information: an identifier of a protocol version supported by the terminal device; and indication information, where the indication information indicates that the protocol version supported by the terminal device is later than or earlier than or equal to the filtering protocol version.

In a possible design, the filtering protocol version includes a protocol version supported by the first access network device and/or a protocol version supported by a first core network device: or the filtering protocol version is earlier than a protocol version supported by the first access network device and/or a protocol version supported by a first core network device.

In a possible design, the protocol version is considered supported by the first access network device if it satisfies either of the following conditions: the first access network device supports a feature of the protocol version, or the first access network device supports parsing of protocol signaling corresponding to the protocol version. The protocol version is considered supported by the first core network device if it satisfies either of the following conditions: the first core network device supports a feature of the protocol version, or the first core network device supports parsing of protocol signaling corresponding to the protocol version.

In a possible design, the communication unit 903 is further configured to: receive, from the first access network device, one or more identifiers of one or more protocol versions supported by at least one neighboring access network device of the first access network device.

In a possible design, the processing unit 902 is further configured to: measure a frequency of a second access network device in the at least one neighboring access network device or reselect the second access network device based on the one or more identifiers of the one or more protocol versions supported by the at least one neighboring access network device, where a protocol version supported by the second access network device is later than or equal to the protocol version supported by the terminal device.

In a possible design, the one or more identifiers of the one or more protocol versions supported by the at least one neighboring access network device is/are carried in an RRC connection release message or a system message.

In a possible design, the one or more identifiers of the one or more filtering protocol versions is/are carried in a capability query message, an RRC connection setup message, an RRC connection resume message, an RRC connection reestablishment message, a handover command message, or a system message.

The apparatus 900 may be the access network device in the foregoing embodiments, or may be a chip disposed in the access network device. The processing unit 902 may support the apparatus 900 in performing the actions of the access network device in the foregoing method examples. Alternatively, the processing unit 902 mainly performs an internal action of the access network device in the method examples, and the communication unit 903 may support communication between the apparatus 900 and another device.

Specifically, in an embodiment, the communication unit 903 is configured to: send an identifier of a filtering protocol version to a terminal device; and receive first capability information from the terminal device, where a protocol version corresponding to the first capability information is earlier than or equal to the filtering protocol version.

In a possible design, the communication unit 903 is further configured to: send the first capability information and the identifier of the filtering protocol version to a first core network device.

In a possible design, the communication unit 903 is further configured to: receive first information from the terminal device, and send the first information to the first core network device, where the first information includes at least one of the following: an identifier of the protocol version corresponding to the first capability information: an identifier of a protocol version supported by the terminal device; and indication information, where the indication information indicates that the protocol version supported by the terminal device is later than or earlier than or equal to the filtering protocol version.

In a possible design, the communication unit 903 is further configured to: receive historical capability information of the terminal device and an identifier of a historical filtering protocol version from the first core network device. The processing unit 902 is configured to: after determining that the filtering protocol version is different from the historical filtering protocol version, send the identifier of the filtering protocol version to the terminal device by using the communication unit 903.

In a possible design, the filtering protocol version is later than the historical filtering protocol version; and the first capability information includes incremental information relative to historical capability information reported by the terminal device based on the historical filtering protocol version.

In a possible design, the communication unit 903 is further configured to: send indication information to the terminal device, where the indication information indicates to report capability information in an incremental manner.

In a possible design, the indication information includes the identifier of the historical filtering protocol version.

In a possible design, the filtering protocol version includes a protocol version supported by the first access network device and/or a protocol version supported by the first core network device: or the filtering protocol version is earlier than a protocol version supported by the first access network device and/or a protocol version supported by the first core network device.

In a possible design, the communication unit 903 is further configured to: obtain capability information of at least one neighboring access network device of the first access network device; and send, to the terminal device, one or more identifiers of one or more protocol versions supported by the at least one neighboring access network device.

In a possible design, the communication unit 903 is further configured to: send the identifier of the filtering protocol version to a second access network device, where the first access network device is a source access network device of the terminal device, and the second access network device is a target access network device of the terminal device.

In a possible design, the one or more identifiers of the one or more filtering protocol versions is/are carried in a capability query message, an RRC connection setup message, an RRC connection resume message, an RRC connection reestablishment message, or a system message.

In a possible design, the communication unit 903 is further configured to: receive a handover request acknowledgment message from a second access network device, where the handover request acknowledgment message includes the identifier of the filtering protocol version, and the identifier of the filtering protocol version is an identifier of a filtering protocol version corresponding to the second access network device, where the first access network device is a source access network device of the terminal device, and the second access network device is a target access network device of the terminal device.

In a possible design, an identifier of a filtering protocol version corresponding to the first access network device is different from the identifier of the filtering protocol version corresponding to the second access network device.

In a possible design, the communication unit 903 is further configured to: send the identifier of the filtering protocol version corresponding to the first access network device to the second access network device.

In a possible design, the communication unit 903 is specifically configured to: send a handover command message to the terminal device, where the handover command message includes the identifier of the filtering protocol version.

The apparatus 900 may be the core network device in the foregoing embodiments, or may be a chip disposed in the core network device. The processing unit 902 may support the apparatus 900 in performing actions of the core network device in the foregoing method examples. Alternatively, the processing unit 902 mainly performs an internal action of the core network device in the method examples, and the communication unit 903 may support communication between the apparatus 900 and another device.

It should be understood that division into the units in the apparatus is merely logical function division. During actual implementation, all or a part of the units may be integrated into one physical entity or may be physically separated. In addition, all the units in the apparatus may be implemented in a form of software invoked by a processing element, or may be implemented in a form of hardware: or a part of units may be implemented in a form of software invoked by a processing element, and a part of units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. In addition, the units may be all or partially integrated, or may be implemented independently. The processing element herein may also be referred to as a processor, and may be an integrated circuit having a signal processing capability. During implementation, operations in the foregoing methods or the foregoing units may be implemented by using a hardware integrated logic circuit in a processor element, or may be implemented in the form of software invoked by the processing element.

In an example, a unit in any one of the foregoing apparatuses may be one or more integrated circuits configured to implement the foregoing methods, for example, one or more application-specific integrated circuits (ASIC), one or more microprocessors (DSP), one or more field programmable gate arrays (FPGA), or a combination of at least two of these forms of integrated circuits. For another example, when the unit in the apparatus may be implemented in a form of scheduling a program by a processing element, the processing element may be a processor, for example, a general-purpose central processing unit (CPU), or another processor that can invoke the program. For still another example, the units may be integrated and implemented in a form of a system-on-a-chip (SOC).

The foregoing receiving unit is an interface circuit of the apparatus, and is configured to receive a signal from another apparatus. For example, when the apparatus is implemented by a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented by a chip, the sending unit is an interface circuit that is of the chip and that is configured to send a signal to another chip or apparatus.

Figure 10:
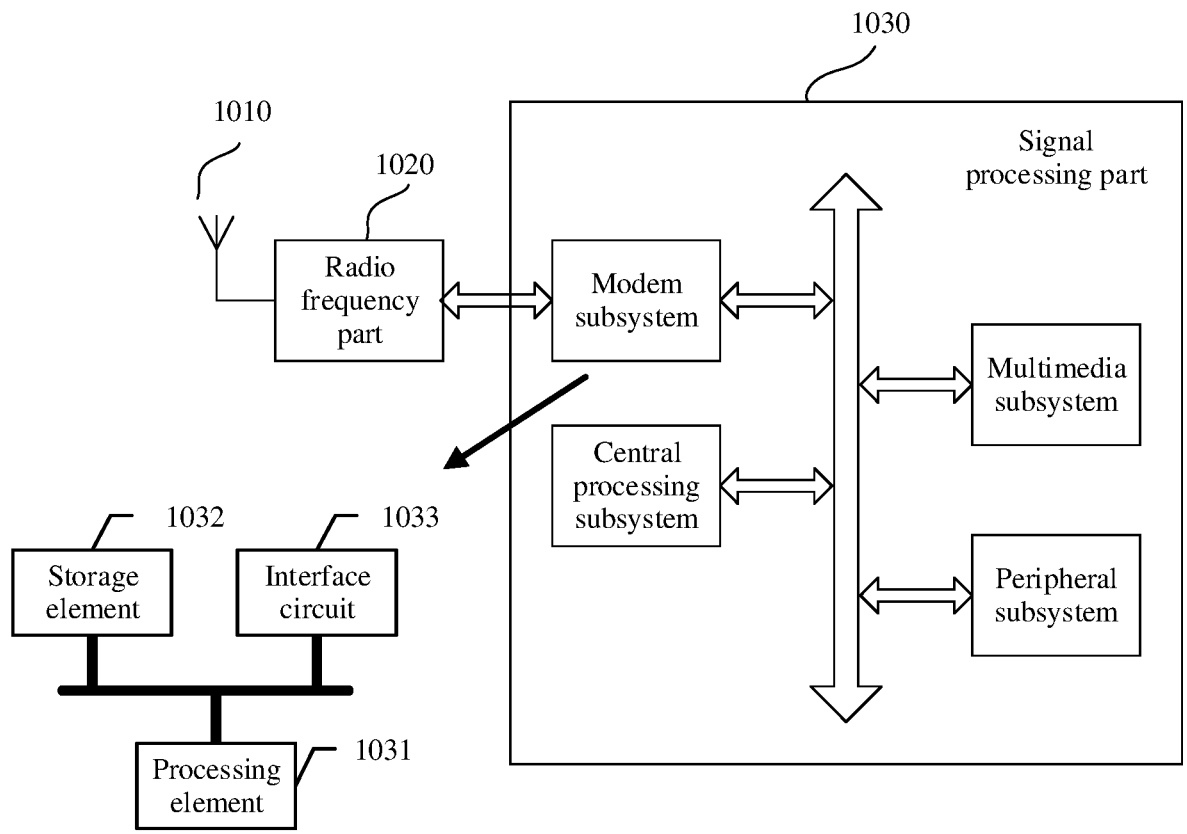
FIG. 10 is a schematic diagram of a structure of a terminal device according to an embodiment of the present disclosure.

FIG. 10 is a schematic diagram of a structure of a terminal device according to an embodiment of the present disclosure. The terminal device may be the terminal device in the foregoing embodiments, and is configured to implement operations of the terminal device in the foregoing embodiments. As shown in FIG. 10, the terminal device includes an antenna 1010, a radio frequency part 1020, and a signal processing part 1030. The antenna 1010 is connected to the radio frequency part 1020. In a downlink direction, the radio frequency part 1020 receives, by using the antenna 1010, information sent by a network device; and sends, to the signal processing part 1030 for processing, the information sent by the network device. In an uplink direction, the signal processing part 1030 processes the information of the terminal, and sends the processed information to the radio frequency part 1020; and the radio frequency part 1020 processes the information of the terminal device, and then sends the processed information to the network device by using the antenna 1010.

The signal processing part 1030 may include a modem subsystem, configured to process data at each communication protocol layer. The signal processing part 1030 may further include a central processing subsystem, configured to process an operating system and an application layer that are of the terminal device. In addition, the signal processing part 1030 may further include another subsystem, for example, a multimedia subsystem, or a peripheral subsystem. The multimedia subsystem is configured to control a camera or a screen display of the terminal device. The peripheral subsystem is configured to connect to another device. The modem subsystem may be a chip that is separately disposed.

The modem subsystem may include one or more processing elements 1031, for example, include a main control CPU and another integrated circuit. In addition, the modem subsystem may further include a storage element 1032 and an interface circuit 1033. The storage element 1032 is configured to store data and a program. However, a program used to perform the methods performed by the terminal device in the foregoing methods may not be stored in the storage element 1032, but is stored in a memory outside the modem subsystem, and is loaded and used by the modem subsystem when to be used. The interface circuit 1033 is configured to communicate with another subsystem.

The modem subsystem may be implemented by a chip. The chip includes at least one processing element and an interface circuit. The processing element is configured to perform the steps of any method performed by the foregoing terminal device. The interface circuit is configured to communicate with another apparatus. In an implementation, units in the terminal device for implementing the steps in the foregoing methods may be implemented in a form of scheduling a program by a processing element. For example, the apparatus used in the terminal device includes a processing element and a storage element. The processing element invokes a program stored in the storage element, to perform the methods performed by the terminal device in the foregoing method embodiments. The storage element may be a storage element located on a same chip as the processing element, namely, an on-chip storage element.

In another implementation, a program used to perform the method performed by the terminal device in the foregoing methods may be in a storage element that is on a different chip from the processing unit, namely, an off-chip storage element. In this case, the processing element invokes or loads the program from the off-chip storage element to the on-chip storage element, to invoke and perform the methods performed by the terminal device in the foregoing method embodiments.

In still another implementation, units of the terminal device that implement the steps in the foregoing methods may be configured as one or more processing elements. The processing elements are disposed in the modem subsystem. The processing element herein may be an integrated circuit, for example, one or more ASICs, one or more DSPs, one or more FPGAs, or a combination of the types of integrated circuits. These integrated circuits may be integrated together to form a chip.

Units of the terminal device that implement the steps in the foregoing methods may be integrated together, and implemented in a form of an SOC. The SOC chip is configured to implement the foregoing methods. At least one processing element and storage element may be integrated into the chip, and the processing element invokes a program stored in the storage element to implement the foregoing methods performed by the terminal device. Alternatively, at least one integrated circuit may be integrated into the chip, to implement the foregoing methods performed by the terminal device. Alternatively, with reference to the foregoing implementations, functions of some units may be implemented by invoking a program by the processing element, and functions of some units may be implemented by the integrated circuit.

It can be learned that the foregoing apparatus used in the terminal device may include at least one processing element and an interface circuit. The at least one processing element is configured to perform any one of the methods that are provided in the foregoing method embodiments and performed by the terminal device. The processing element may perform, in a first manner, to be specific, by invoking the program stored in the storage element, some or all steps performed by the terminal device: or may perform, in a second manner, to be specific, by using a hardware integrated logic circuit in the processor element in combination with instructions, some or all steps performed by the terminal device: or may certainly perform, by combining the first manner and the second manner, some or all steps performed by the terminal device.

The processing element herein is the same as that described above, and may be implemented by using a processor. A function of the processing element may be the same as a function of the processing unit described in FIG. 9. For example, the processing element may be a general-purpose processor, for example, a CPU, or may be one or more integrated circuits configured to implement the foregoing methods, for example, one or more ASICs, one or more microprocessors DSPs, or one or more FPGAs, or a combination of at least two of the integrated circuit forms. The storage element may be implemented by using a memory. A function of the storage element may be the same as a function of the storage unit described in FIG. 9. The storage element may be one memory, or an umbrella term of a plurality of memories.

The terminal device shown in FIG. 10 can implement all processes related to the terminal device in the foregoing method embodiments. Operations and/or functions of the modules in the terminal device shown in FIG. 10 are intended to implement the corresponding procedures in the foregoing method embodiments. For details, refer to the descriptions in the foregoing method embodiments. To avoid repetition, detailed descriptions are properly omitted herein.

Figure 11:
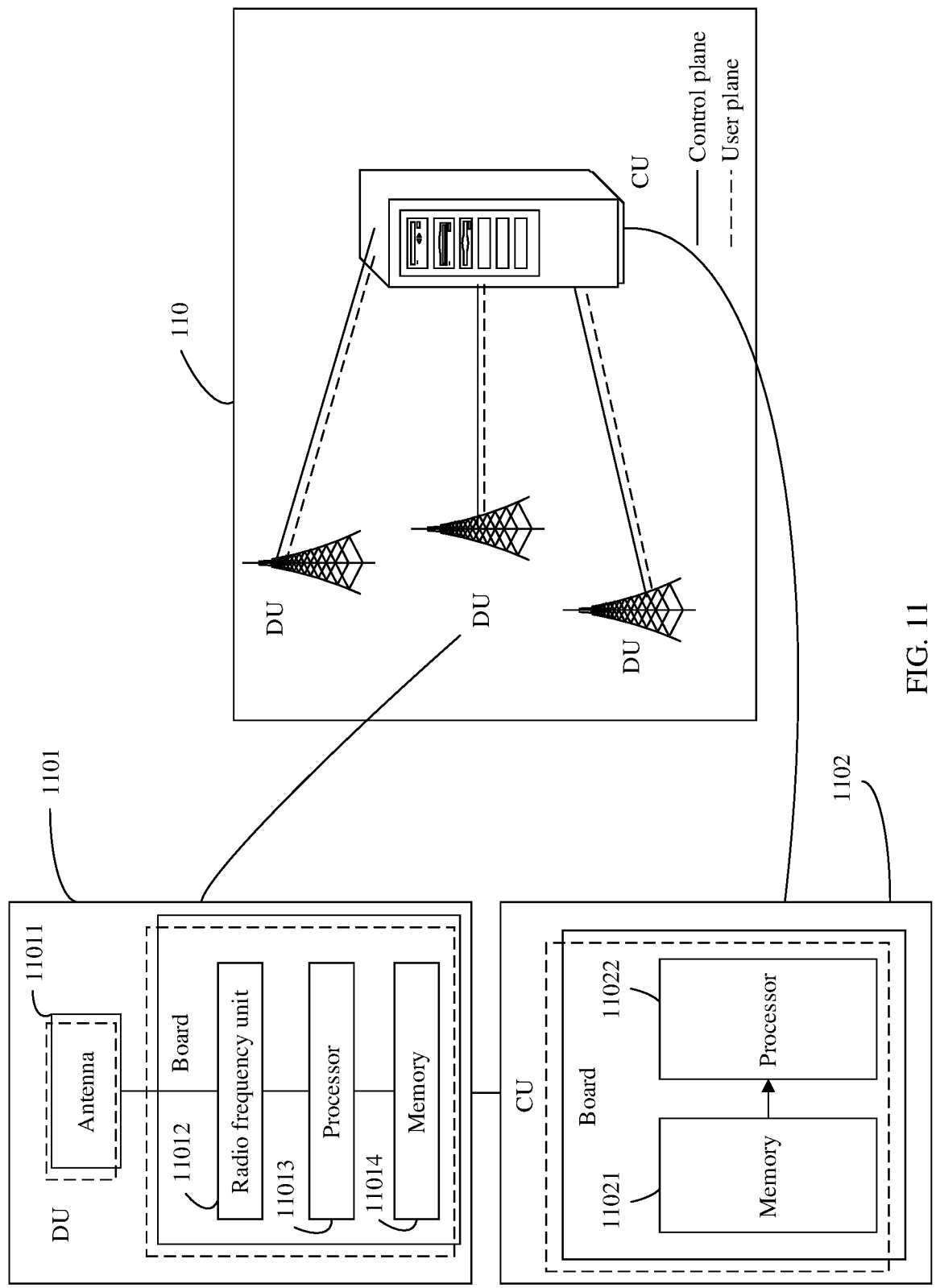
FIG. 11 is a schematic diagram of a structure of an access network device according to an embodiment of the present disclosure.

FIG. 11 is a schematic diagram of a structure of an access network device according to an embodiment of the present disclosure. The access network device (or a base station) may be used in the system architecture shown in FIG. 1, to perform a function of the access network device in the foregoing method embodiments. The access network device 110 may include one or more DUs 1101 and one or more CUs 1102. The DU 1101 may include at least one antenna 11011, at least one radio frequency unit 11012, at least one processor 11013, and at least one memory 11014. The DU 1101 is mainly configured to: send and receive a radio frequency signal, perform conversion between a radio frequency signal and a baseband signal, and perform partial baseband processing. The CU 1102 may include at least one processor 11022 and at least one memory 11021.

The CU 1102 is mainly configured to perform baseband processing, control an access network device, and so on. The DU 1101 and the CU 1102 may be physically disposed together, or may be physically disposed separately, namely, a distributed base station. The CU 1102 is a control center of the access network device, may also be referred to as a processing unit, and is mainly configured to complete a baseband processing function. For example, the CU 1102 may be configured to control the access network device to perform an operation procedure related to the access network device in the foregoing method embodiments.

In addition, optionally, the access network device 110 may include one or more radio frequency units, one or more DUs, and one or more CUs. The DU may include the at least one processor 11013 and the at least one memory 11014, the radio frequency unit may include the at least one antenna 11011 and the at least one radio frequency unit 11012, and the CU may include the at least one processor 11022 and the at least one memory 11021.

In an example, the CU 1102 may include one or more boards, and the plurality of boards may jointly support a radio access network (for example, a 5G network) of a single access standard, or may separately support radio access networks (such as an LTE network, a 5G network, or another network) of different access standards. The memory 11021 and the processor 11022 may serve one or more boards. In other words, a memory and a processor may be disposed on each board. Alternatively, a plurality of boards may share a same memory and a same processor. In addition, a necessary circuit may further be disposed on each board. The DU 1101 may include one or more boards, and a plurality of boards may jointly support a radio access network (for example, a 5G network) of a single access standard, or may separately support radio access networks (such as an LTE network, a 5G network, or another network) of different access standards. The memory 11014 and the processor 11013 may serve one or more boards. In other words, a memory and a processor may be disposed on each board. Alternatively, a plurality of boards may share a same memory and a same processor. In addition, a necessary circuit may further be disposed on each board.

The access network device shown in FIG. 11 can implement all processes related to the access network device in the foregoing method embodiment. Operations and/or functions of the modules in the access network device shown in FIG. 11 are intended to implement the corresponding procedures in the foregoing method embodiments. For details, refer to the descriptions in the foregoing method embodiments. To avoid repetition, detailed descriptions are properly omitted herein.

Figure 12:
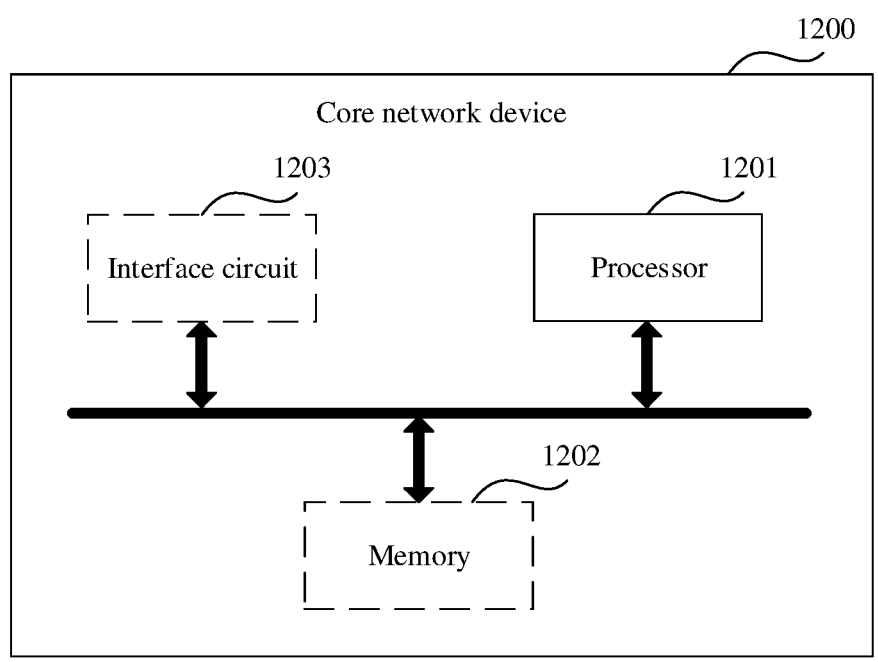
FIG. 12 is a schematic diagram of a structure of a core network device according to an embodiment of the present disclosure.

FIG. 12 is a schematic diagram of a structure of a core network device according to an embodiment of the present disclosure. The core network device may be an AMF network element and/or another possible network element (for example, an SMF network element), and is configured to implement operations of the core network device in the foregoing embodiments.

As shown in FIG. 12, the core network device 1200 may include a processor 1201, a memory 1202, and an interface circuit 1203. The processor 1201 may be configured to process a communication protocol and communication data, and control a communication apparatus. The memory 1202 may be configured to store the program and data, and the processor 1201 may perform, based on the program, the method performed by the core network device in embodiments of the present disclosure. The interface circuit 1203 may be used for communication between the core network device 1200 and another device. The communication may be wired communication or wireless communication. The interface circuit may be, for example, a service-based communication interface.

Alternatively, the memory 1202 may be externally connected to the core network device 1200. In this case, the core network device 1200 may include the interface circuit 1203 and the processor 1201. Alternatively, the interface circuit 1203 may be externally connected to the core network device 1200. In this case, the core network device 1200 may include the memory 1202 and the processor 1201. When both the interface circuit 1203 and the memory 1202 are externally connected to the core network device 1200, the core network device 1200 may include the processor 1201.

The core network device shown in FIG. 12 can implement all processes related to the core network device in the foregoing method embodiment. Operations and/or functions of the modules in the core network device shown in FIG. 12 are intended to implement the corresponding procedures in the foregoing method embodiments. For details, refer to the descriptions in the foregoing method embodiments. To avoid repetition, detailed descriptions are properly omitted herein.

The terms "system" and "network" may be used interchangeably in embodiments of the present disclosure. "At least one" means one or more, and "a plurality of" means two or more. The term "and/or" describes an association relationship for describing associated objects and represents that any one of three relationships may exist. For example, A and/or B may represent one of the following cases: Only A exists, both A and B exist, and only B exists, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, "at least one of A, B, and C" includes A, B, C, AB, AC, BC, or ABC. In addition, unless otherwise stated, ordinal numbers such as "first" and "second" in embodiments of the present disclosure are used to distinguish between a plurality of objects, and are not used to limit an order, a time sequence, priorities, or importance of the plurality of objects.

A person skilled in the art should understand that embodiments of the present disclosure may be provided as a method, a system, or a computer program product. Therefore, the present disclosure may use a form of hardware only embodiments, software only embodiments, or embodiments with a combination of software and hardware. In addition, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clearly that a person skilled in the art can make various modifications and variations to the present disclosure without departing from the spirit and scope of the present disclosure. The present disclosure is intended to cover these modifications and variations of the present disclosure provided that they fall within the scope of protection defined by the following claims and their equivalent technologies.

What is claimed is:

1. A communication method, wherein the method is applicable to a terminal device or a chip in the terminal device, and the method comprises:
receiving an identifier of a filtering protocol version from a first access network device; and
sending capability information of the terminal device to the first access network device based on the filtering protocol version, wherein the sending capability information of the terminal device to the first access network device based on the file protocol version comprises:
after determining, based or the filtering protocol version that the filtering protocol version is different from a historical filtering protocol version, sending the capability information of the terminal device to the first access network device, wherein the historical filtering protocol version comprises a filtering protocol version previously received by the terminal device.

2. The method according to claim 1, wherein a protocol version corresponding to the capability information is earlier than or equal to the filtering protocol version.

3. The method according to claim 1, wherein the filtering protocol version is later than the historical filtering protocol version; and
the capability information comprises incremental information relative to historical capability information reported by the terminal device based on the historical filtering protocol version.

4. The method according to claim 3, further comprising:
receiving indication information from the first access network device, wherein the indication information indicates to report capability information in an incremental manner.

5. The method according to claim 4, wherein the indication information comprises an identifier of the historical filtering protocol version.

6. The method according to claim 1, further comprising:
sending at least one of the following to the first access network device:
an identifier of a protocol version corresponding to the capability information;
an identifier of a protocol version supported by the terminal device; or
indication information indicating that the protocol version supported by the terminal device is later than, earlier than, or equal to the filtering protocol version.

7. The method according to claim 1, wherein the filtering protocol version comprises a protocol version supported by the first access network device and/or a protocol version supported by a core network device; or
the filtering protocol version is earlier than a protocol version supported by the first access network device and/or a protocol version supported by a core network device.

8. The method according to claim 7, wherein the protocol version is considered supported by the first access network device when the first access network device supports a feature of the protocol version, or supports parsing of protocol signaling corresponding to the protocol version; or
the protocol version is considered supported by the core network device when the core network device supports a feature of the protocol version, or supports parsing of protocol signaling corresponding to the protocol version.

9. The method according to claim 1, further comprising:
receiving, from the first access network device, one or more identifiers of one or more protocol versions supported by at least one neighboring access network device of the first access network device.

10. The method according to claim 9, further comprising:
measuring a frequency of a second access network device in the at least one neighboring access network device or reselecting the second access network device based on the one or more identifiers of the one or more protocol versions supported by the at least one neighboring access network device, wherein a protocol version supported by the second access network device is later than or equal to the protocol version supported by the terminal device.

11. The method according to claim 9, wherein the one or more identifiers of the one or more protocol versions supported by the at least one neighboring access network device is/are carried in a radio resource control (RRC) connection release message or a system message.

12. The method according to claim 1, wherein the historical filtering protocol version is a filtering protocol version corresponding to an identifier of a filtering protocol version previously received by the terminal device.

13. A communication apparatus, comprising a transceiver configured to:
receive an identifier of a filtering protocol version from a first access network device; and
send capability information of the communication apparatus to the first access network device based on the filtering protocol version,
wherein the transceiver is further configured to:
after determining, based on the filtering protocol version, that the filtering protocol version is different from a historical filtering protocol version, send the capability information of the communication apparatus to the first access network device, wherein the historical filtering protocol version comprises a filtering protocol version previously received by the communication apparatus.

14. The apparatus according to claim 13, wherein a protocol version corresponding to the capability information is earlier than or equal to the filtering protocol version.

15. The apparatus according to claim 13, wherein the filtering protocol version is later than the historical filtering protocol version; and
the capability information comprises incremental information relative to historical capability information reported by the communication apparatus based on the historical filtering protocol version.

16. The apparatus according to claim 15, wherein the transceiver is further configured to:
receive indication information from the first access network device, wherein the indication information indicates to report capability information in an incremental manner.

17. The apparatus according to claim 13, wherein the transceiver is further configured to:
send at least one of the following to the first access network device:
an identifier of a protocol version corresponding to the capability information;
an identifier of a protocol version supported by the communication apparatus; or
indication information indicating that the protocol version supported by the communication apparatus is later than, earlier than, or equal to the filtering protocol version.

18. The apparatus according to claim 13, wherein the transceiver is further configured to:
receive, from the first access network device, one or more identifiers of one or more protocol versions supported by at least one neighboring access network device of the first access network device.

19. A non-transitory computer-readable medium, storing a computer program or instructions that, when executed by a communication apparatus, control(s) the communication apparatus to perform operations comprising:

receiving an identifier of a filtering protocol version from a first access network device; and sending capability information of the communication apparatus to the first access network device based on the filtering protocol version, wherein the sending capability information of the communication apparatus to the first access network device based on the filtering protocol version comprises:

after determining, based on the filtering protocol version, that the filtering protocol version is different from a historical filter protocol version, sending the capability information of the communication apparatus to the first access network device, wherein the historical filtering protocol version comprises a filtering protocol version previously received by the communication apparatus.

* * * * *

UNITED STATES PATENT AND TRADEMARK OFFICE
CERTIFICATE OF CORRECTION

| | | |
|---|---|---|
| PATENT NO. | : 12,470,971 B2 | Page 1 of 1 |
| APPLICATION NO. | : 18/148509 | |
| DATED | : November 11, 2025 | |
| INVENTOR(S) | : Junren Chang et al. | |

It is certified that error appears in the above-identified patent and that said Letters Patent is hereby corrected as shown below:

In the Claims

Column 49, Claim 1, Line 3, change "file protocol" to --filtering protocol--;

Column 49, Claim 1, Line 4, change "or" to --on--; and

Column 51, Claim 19, Line 11, change "filter protocol" to --filtering protocol--.

Signed and Sealed this
Ninth Day of December, 2025

John A. Squires
*Director of the United States Patent and Trademark Office*